(12) United States Patent
Nishi et al.

(10) Patent No.: US 9,116,408 B2
(45) Date of Patent: Aug. 25, 2015

(54) LIQUID CRYSTAL ELEMENT AND METHOD FOR MANUFACTURING THE SAME

(71) Applicant: SEMICONDUCTOR ENERGY LABORATORY CO., LTD., Atsugi-shi, Kanagawa-ken (JP)

(72) Inventors: Takeshi Nishi, Kanagawa (JP); Yoshiharu Hirakata, Kanagawa (JP); Takahiro Yamamoto, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 140 days.

(21) Appl. No.: 13/669,491

(22) Filed: Nov. 6, 2012

(65) Prior Publication Data

US 2013/0120692 A1 May 16, 2013

(30) Foreign Application Priority Data

Nov. 11, 2011 (JP) ................. 2011-247291

(51) Int. Cl.
*G02F 1/137* (2006.01)
*G02F 1/1337* (2006.01)

(52) U.S. Cl.
CPC ...... *G02F 1/13743* (2013.01); *G02F 1/133707* (2013.01); *G02F 2001/13793* (2013.01)

(58) Field of Classification Search
CPC ............... G02F 2001/13793; G02F 1/133707
USPC .................................. 349/129, 141
See application file for complete search history.

(56) References Cited

U.S. PATENT DOCUMENTS

| | | | |
|---|---|---|---|
| 7,576,829 B2 | 8/2009 | Kikuchi et al. | |
| 7,648,647 B2 | 1/2010 | Kikuchi et al. | |
| 7,722,783 B2 | 5/2010 | Haseba et al. | |
| 7,794,621 B2 | 9/2010 | Schott et al. | |
| 2007/0080370 A1* | 4/2007 | Miyachi et al. | 257/107 |
| 2008/0259254 A1 | 10/2008 | Kikuchi et al. | |
| 2008/0280071 A1 | 11/2008 | Kikuchi et al. | |
| 2009/0135368 A1 | 5/2009 | Haseba et al. | |
| 2009/0213285 A1* | 8/2009 | Yun et al. | 349/33 |
| 2009/0267025 A1 | 10/2009 | Schott et al. | |
| 2010/0103366 A1 | 4/2010 | Farrand et al. | |
| 2010/0258763 A1 | 10/2010 | Schott et al. | |
| 2010/0302492 A1* | 12/2010 | Kubota et al. | 349/138 |

(Continued)

FOREIGN PATENT DOCUMENTS

| | | |
|---|---|---|
| JP | 2003-073669 | 3/2003 |
| JP | 2003-327966 | 11/2003 |

(Continued)

OTHER PUBLICATIONS

"Ekisho Binran (Liquid Crystal Handbook)", 1st ed., edited by Editorial Committee for "Ekisho Binran (Liquid Crystal Handbook)", published by Maruzen Co., Ltd., Oct. 30, 2000, p. 135, col. 11. 14-col. 2 1.2.

*Primary Examiner* — Michael Caley
(74) *Attorney, Agent, or Firm* — Nixon Peabody, LLC; Jeffrey L. Costellia

(57) ABSTRACT

A liquid crystal element with a high contrast ratio and a method for manufacturing thereof is provided. A liquid crystal element includes a structure body containing a liquid crystal through which diffracted light of the same or substantially the same wavelength is emitted in a blue phase, i.e., a structure body containing a liquid crystal which shows platelet texture which is not varied.

28 Claims, 9 Drawing Sheets

(56) References Cited

U.S. PATENT DOCUMENTS

| | | |
|---|---|---|
| 2010/0328565 A1* | 12/2010 | Kubota et al. .................. 349/43 |
| 2011/0249229 A1* | 10/2011 | Kubota et al. ................. 349/141 |
| 2012/0012785 A1 | 1/2012 | Schott et al. |
| 2012/0138853 A1 | 6/2012 | Kubota et al. |
| 2013/0105732 A1 | 5/2013 | Kubota et al. |
| 2013/0242233 A1 | 9/2013 | Kubota et al. |

FOREIGN PATENT DOCUMENTS

| | | |
|---|---|---|
| JP | 2008-524347 | 7/2008 |
| JP | 2008-303381 | 12/2008 |
| JP | 2009-144135 | 7/2009 |
| JP | 2010-510256 | 4/2010 |
| WO | WO 2005/090520 A1 | 9/2005 |

\* cited by examiner

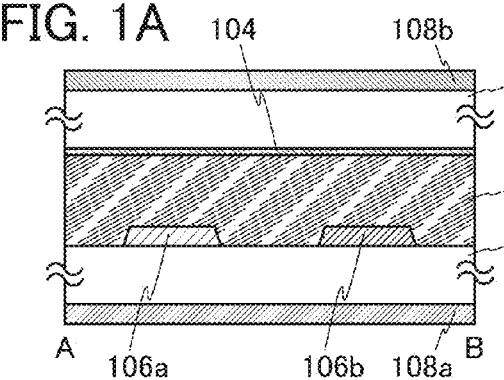
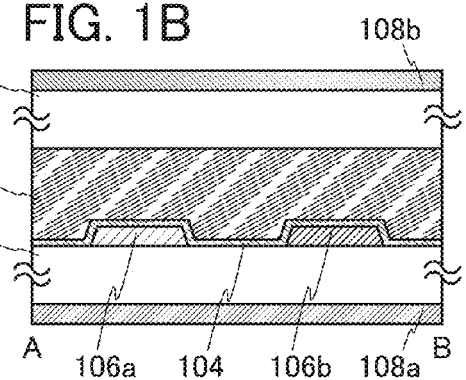
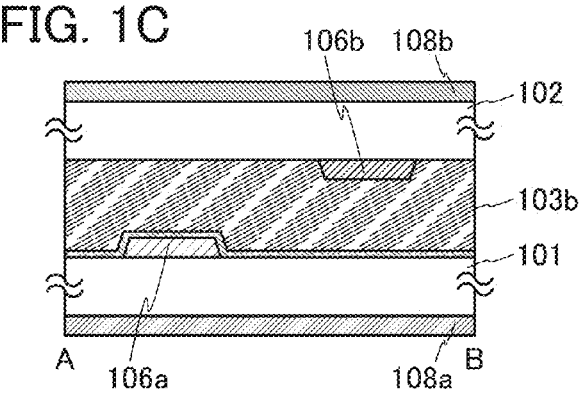
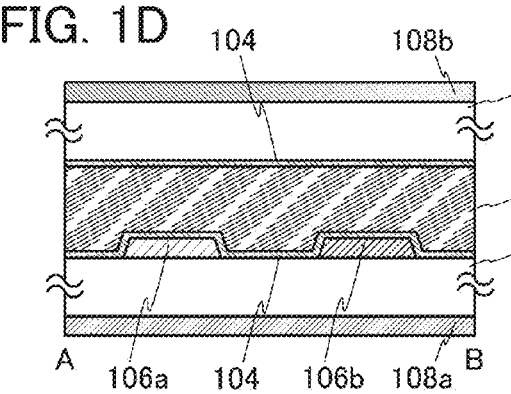
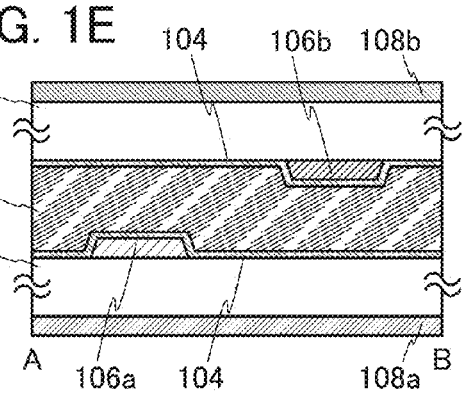

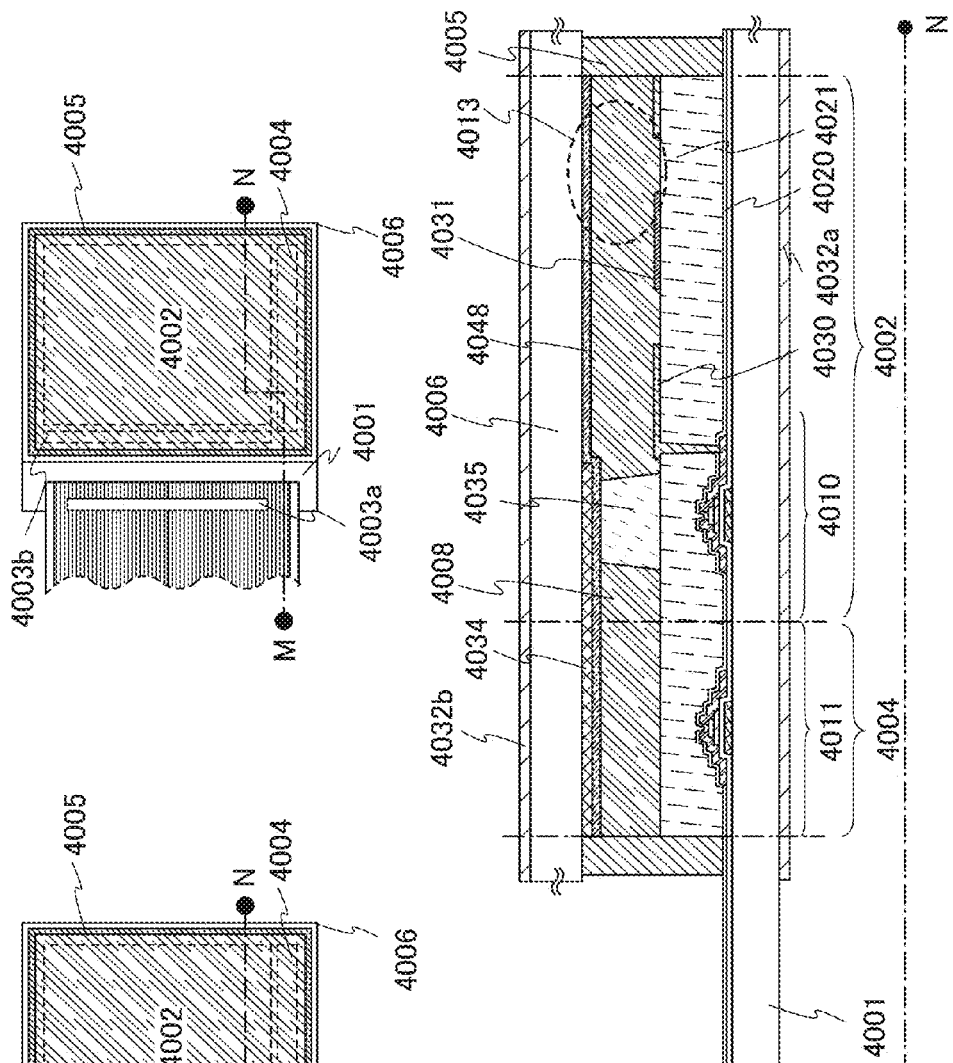

LIQUID CRYSTAL ELEMENT AND METHOD FOR MANUFACTURING THE SAME

BACKGROUND OF THE INVENTION

1. Field of the Invention

The present invention relates to a liquid crystal element. Further, the present invention relates to a method for manufacturing the liquid crystal element.

2. Description of the Related Art

In recent years, liquid crystal has been applied to a variety of devices; in particular, a liquid crystal display device (liquid crystal display) having such advantages as thinness and lightness has been used for displays in a wide range of fields.

For a larger and higher-resolution display screen, shorter response time of liquid crystal has been required, and development thereof has been advanced (for example, see Patent Document 1).

As a display mode using a liquid crystal capable of quick response to an input signal, there is a display mode using a structure body containing a liquid crystal exhibiting a blue phase (e.g., a polymer-stabilized liquid crystal). The mode using a liquid crystal exhibiting a blue phase achieves quick response to an input signal, does not require an alignment film, and provides a wide viewing angle, and thus has been developed more actively for practical use (for example, see Patent Document 2).

It is said that a blue phase liquid crystal is provided with a high-order three-dimensional lattice structure which is different from that of a nematic liquid crystal, and the space in the lattice of a blue phase can be changed by controlling the concentration of a chiral material added. In a blue phase material interposed between substrates having a light-transmitting property with respect to visible light, a phenomenon in which visible light is diffracted by the lattice structure of the blue phase can be seen with the naked eyes.

For example, in a conventional blue phase, about two kinds of tile-shaped regions exhibiting different colors can be seen with a microscope. The diameter of each region is typically 20 μm to 40 μm, and the regions are irregularly arranged. Such a state is also called platelet texture (Non-Patent Document 1).

The color of each region is derived from the space in the lattice structure with respect to the observation side. The regions exhibiting about two colors are observed, which means that two different regions are mixed and that the orientation plane of the lattice structure in one of the regions, which is oriented to the observation side, is different from the orientation plane of the lattice structure in the other of the regions, which is oriented to the observation side. That is, the platelet texture is constituted by about two kinds of regions with different orientation states.

REFERENCE

Patent Documents

[Patent Document 1] Japanese Published Patent Application No. 2008-303381
[Patent Document 2] PCT International Publication No. 2005-090520
[Non-Patent Document 1] "Ekisho Binran (Liquid Crystal Handbook)", 1$^{st}$ ed., edited by Editorial Committee for "Ekisho Binran (Liquid Crystal Handbook)", published by Maruzen Co., Ltd., 2000, Oct. 30, p. 135

SUMMARY OF THE INVENTION

A transmissive liquid crystal element can be switched between a light-transmissive state (also called bright state) and a light-blocking state (also called dark state); thus, the transmissive liquid crystal element can be used for a transmissive display or the like. A reflective liquid crystal element can be switched between a reflective state (also called bright state) and a light-blocking state (also called dark state); thus, the reflective liquid crystal element can be used for a reflective display or the like. Further, a semi-transmissive display provided with a transmissive liquid crystal element and a reflective liquid crystal element is also known.

It is preferable that a display have a high ratio between the luminance in a bright state and the luminance in a dark state (also called contrast ratio). For example, if a transmissive display has a low contrast ratio, light leakage occurs in a dark state. Therefore, the luminance in a dark part of a display image cannot be sufficiently decreased, whereby an image cannot be displayed vividly.

Although a display mode using a liquid crystal exhibiting a conventional blue phase has achieved quick response to an input signal, there is a problem of a low contrast ratio in a transmissive liquid crystal element, a reflective liquid crystal element, and a semi-transmissive liquid crystal element each including the blue phase.

One embodiment of the present invention is made in view of the foregoing technical background. It is an object to provide a liquid crystal element with a high contrast ratio. It is another object to provide a method for manufacturing a liquid crystal element with a high contrast ratio.

To achieve any of the above objects, one embodiment of the present invention focuses on a boundary portion in which regions with different orientation states are in contact with each other in platelet texture. The present inventors have found that the boundary portion tends to exhibit a phase (e.g., a cholesteric phase) in which light is likely to be scattered. The present inventors have conceived a liquid crystal element including a structure body containing a liquid crystal through which diffracted light of the same or substantially the same wavelength is emitted in a blue phase, i.e., a structure body containing a liquid crystal which shows platelet texture which is not varied, leading to the solution of any of the above problems.

One embodiment of the present invention is a liquid crystal element including a pair of polarizing plates, a structure body containing a liquid crystal which is disposed between the pair of polarizing plates, a pair of substrates between which the structure body containing a liquid crystal is interposed, and a pair of electrodes for applying an electric field to the structure body containing a liquid crystal. In the liquid crystal element, one of the pair of electrodes is provided on one of the pair of substrates, and the other of the pair of electrodes is provided on any of the pair of substrates. In addition, through the structure body containing a liquid crystal, diffracted light of the same or substantially the same wavelength is emitted in a blue phase.

The transmissive liquid crystal element of one embodiment of the present invention includes the structure body containing a liquid crystal through which diffracted light of the same or substantially the same wavelength is emitted in a blue phase, i.e., a structure body containing a liquid crystal which shows platelet texture which is not varied. With such a structure, it is possible to reduce the area which tends to exhibit a phase (e.g., a cholesteric phase) in which light is likely to be scattered, specifically the area of a boundary portion with different orientation states in platelet texture. Thus, a liquid crystal element with a high contrast ratio can be provided.

One embodiment of the present invention includes a pair of polarizing plates, a structure body containing a liquid crystal which is disposed between the pair of polarizing plates, a pair of substrates between which the structure body containing a liquid crystal is interposed, and a pair of electrodes for applying an electric field to the structure body containing a liquid crystal. One of the pair of electrodes is provided on one of the pair of substrates, and the other of the pair of electrodes is provided on any of the pair of substrates. In addition, the structure body containing a liquid crystal is in contact with a stabilization part provided on at least one of the pair of substrates. Through the structure body containing a liquid crystal, diffracted light of the same or substantially the same wavelength is emitted in a blue phase.

The transmissive liquid crystal element of one embodiment of the present invention includes the structure body containing a liquid crystal which is in contact with the stabilization part provided on at least one of the pair of substrates and through which diffracted light of the same or substantially the same wavelength is emitted in a blue phase. By the effect of the stabilization part, it is possible to reduce the area in the structure body containing a liquid crystal, which tends to exhibit a phase (e.g., a cholesteric phase) in which light is likely to be scattered, specifically the area of a boundary portion with different orientation states in platelet texture. Thus, a liquid crystal element with a high contrast ratio can be provided.

One embodiment of the present invention includes a pair of polarizing plates, a structure body containing a liquid crystal which is disposed between the pair of polarizing plates, a pair of substrates between which the structure body containing a liquid crystal is interposed, and a pair of electrodes for applying an electric field to the structure body containing a liquid crystal. One of the pair of electrodes is provided on one of the pair of substrates, and the other of the pair of electrodes is provided on any of the pair of substrates. In addition, the structure body containing a liquid crystal is in contact with a stabilization part provided on at least one of the pair of substrates. Through the structure body containing a liquid crystal, diffracted light of the same or substantially the same wavelength is emitted in a blue phase. Further, the stabilization part contains a blue phase.

The transmissive liquid crystal element of one embodiment of the present invention includes the structure body containing a liquid crystal which is in contact with the stabilization part containing a blue phase which is provided on at least one of the pair of substrates. Through the structure body containing a liquid crystal, diffracted light of the same or substantially the same wavelength is emitted in a blue phase. By the effect of the stabilization part containing a blue phase, it is possible to reduce the area in the structure body containing a liquid crystal, which tends to exhibit a phase (e.g., a cholesteric phase) in which light is likely to be scattered, specifically the area of a boundary portion with different orientation states in platelet texture. Further, the blue phase which is stabilized by contact with the stabilization part containing a blue phase is exhibited in a wide temperature range. Thus, it is possible to provide a liquid crystal element with a high contrast ratio in a wide temperature range.

One embodiment of the present invention is any of the above liquid crystal elements, in which the stabilization part includes structure bodies arranged in a stripe or islands pattern, or in a matrix.

The transmissive liquid crystal element of one embodiment of the present invention includes the structure body containing a liquid crystal, which is in contact with the stabilization part which is provided on at least one of the pair of substrates and includes the structure bodies arranged in a stripe or islands pattern, or in a matrix. Through the structure body containing a liquid crystal, diffracted light of the same or substantially the same wavelength is emitted in a blue phase. The stabilization part includes the structure bodies arranged in a stripe or islands pattern, or in a matrix; thus, a surface interaction force which is excessively applied from the substrate to the structure body containing a liquid crystal is made uniform. Further, the stabilization part can help the structure body containing a liquid crystal to form its structure in a self-organized manner and can reduce the area which tends to exhibit a phase (e.g., a cholesteric phase) in which light is likely to be scattered, specifically the area of a boundary portion with different orientation states in platelet texture.

One embodiment of the present invention is any of the above liquid crystal elements, in which the stabilization part includes the structure bodies arranged at intervals each of which is an integral multiple of a distance between central axes of double twist cylinders formed by molecules of the liquid crystal exhibiting a blue phase.

The transmissive liquid crystal element of one embodiment of the present invention includes the structure body containing a liquid crystal on at least one of the pair of substrates. The structure body containing a liquid crystal is in contact with the stabilization part including the structure bodies arranged at intervals each of which is an integral multiple of a distance between central axes of double twist cylinders formed by molecules of the liquid crystal exhibiting a blue phase. Through the structure body containing a liquid crystal, diffracted light of the same or substantially the same wavelength is emitted in a blue phase. The stabilization part includes the structure bodies arranged at intervals each of which is an integral multiple of a distance between central axes of double twist cylinders formed by molecules of the liquid crystal exhibiting a blue phase. Thus, a surface interaction force which is excessively applied from the substrate to the structure body containing a liquid crystal is made uniform. The stabilization part can help the structure body containing a liquid crystal to form its structure in a self-organized manner and can reduce the area which tends to exhibit a phase (e.g., a cholesteric phase) in which light is likely to be scattered, specifically the area of a boundary portion with different orientation states in platelet texture.

One embodiment of the present invention is a method for manufacturing a liquid crystal element including a pair of polarizing plates, a structure body containing a liquid crystal which is disposed between the pair of polarizing plates, a pair of substrates between which the structure body containing a liquid crystal is interposed, and a pair of electrodes for applying an electric field to the structure body containing a liquid crystal. In the liquid crystal element, one of the pair of electrodes is provided on one of the pair of substrates, and the other of the pair of electrodes is provided on any of the pair of substrates. The structure body containing a liquid crystal is in contact with a stabilization part provided on at least one of the pair of substrates. Through the structure body containing a liquid crystal, diffracted light of the same or substantially the same wavelength is emitted in a blue phase. The method specifically includes a first step of forming the stabilization part on one of the substrates, a second step of disposing a mixture including a liquid crystal composition and a polymerizable monomer between the pair of substrates to be in contact with the stabilization part provided on one of the substrates, and a third step of performing polymer stabilization treatment on the mixture exhibiting a blue phase to form the structure body containing a liquid crystal.

By the method for manufacturing a liquid crystal element of one embodiment of the present invention, it is possible to provide a liquid crystal display device including a structure body containing a liquid crystal through which diffracted light of the same or substantially the same wavelength is emitted in a blue phase. Accordingly, a method for manufacturing a liquid crystal element with a high contrast ratio in a wide temperature range can be provided.

One embodiment of the present invention is a method for manufacturing a liquid crystal element including a pair of polarizing plates, a structure body containing a liquid crystal which is disposed between the pair of polarizing plates, a pair of substrates between which the structure body containing a liquid crystal is interposed, and a pair of electrodes for applying an electric field to the structure body containing a liquid crystal. In the liquid crystal element, one of the pair of electrodes is provided on one of the pair of substrates, and the other of the pair of electrodes is provided on any of the pair of substrates. The structure body containing a liquid crystal is in contact with a stabilization part provided on at least one of the pair of substrates. Through the structure body containing a liquid crystal, diffracted light of the same or substantially the same wavelength is emitted in a blue phase. The method specifically includes a first step of disposing a mixture including a liquid crystal composition and a polymerizable monomer between the pair of substrates, and a second step of performing polymer stabilization treatment on the mixture exhibiting an isotropic phase to form the stabilization part on at least one of the substrates and the structure body containing a liquid crystal.

By the method for manufacturing a liquid crystal element of one embodiment of the present invention, it is possible to provide a liquid crystal display device including a structure body containing a liquid crystal through which diffracted light of the same or substantially the same wavelength is emitted in a blue phase. Accordingly, a method for manufacturing a liquid crystal element with a high contrast ratio in a wide temperature range can be provided.

According to one embodiment of the present invention, a liquid crystal element with a high contrast ratio can be provided. Further, a method for manufacturing a liquid crystal element with a high contrast ratio can be provided.

BRIEF DESCRIPTION OF THE DRAWINGS

FIGS. 1A to 1E are cross-sectional views each showing a structure of a liquid crystal element according to an embodiment.

FIGS. 7A1, 7A2, and 7B show a liquid crystal display panel according to an embodiment.

DETAILED DESCRIPTION OF THE INVENTION

Figure 2A:
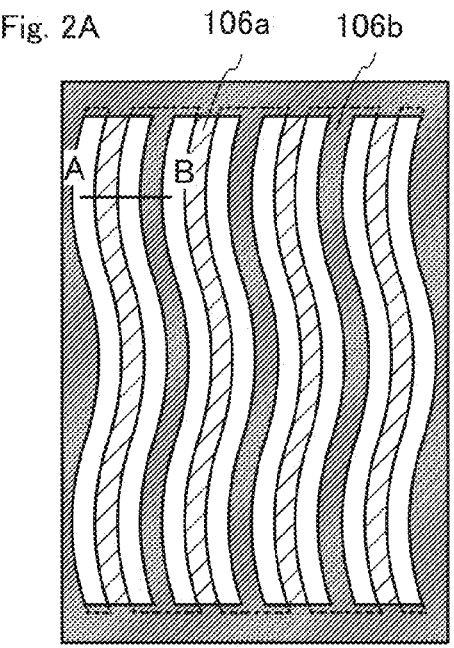
FIGS. 2A to 2D are top views each showing a structure of a liquid crystal element according to an embodiment.

Embodiments will be described in detail with reference to drawings. Note that the present invention is not limited to the following description, and it will be easily understood by those skilled in the art that various changes and modifications can be made without departing from the spirit and scope of the present invention. Therefore, the present invention should not be construed as being limited to the description in the following embodiments. Note that in the structures of the present invention described below, the same portions or portions having similar functions are denoted by the same reference numerals in different drawings, and description of such portions is not repeated.

Embodiment 1

In this embodiment, a structure of a liquid crystal element of one embodiment of the present invention will be described. This embodiment specifically describes, with reference to FIGS. 1A to 1E, FIGS. 2A to 2D, and FIGS. 3A to 3C, a structure in which a liquid crystal element includes a structure body containing a liquid crystal through which diffracted light of the same or substantially the same wavelength is emitted in a blue phase, i.e., a structure body containing a liquid crystal which shows platelet texture which is not varied.

A liquid crystal element of one embodiment of the present invention which is exemplified in this embodiment includes a structure body containing a liquid crystal through which diffracted light of the same or substantially the same wavelength is emitted in a blue phase. With such a structure, it is possible to reduce the area which tends to exhibit a phase (e.g., a cholesteric phase) in which light is likely to be scattered, specifically the area of a boundary portion with different orientation states in platelet texture. Thus, a liquid crystal element with a high contrast ratio can be provided.

Structure of Liquid Crystal Element

A transmissive liquid crystal element of one embodiment of the present invention will be described. The structure of the cross section of the transmissive liquid crystal element is exemplified in FIGS. 1A to 1E.

In the liquid crystal element of one embodiment of the present invention, a pair of substrates (a first substrate 101 and a second substrate 102) is provided between a pair of polarizing plates (a first polarizing plate 108a and a second polarizing plate 108b), and a structure body 103b containing a liquid crystal is interposed between the first substrate 101 and the second substrate 102. In addition, the structure body 103b containing a liquid crystal is provided in contact with a stabilization part 104, and a pair of electrodes (a first electrode 106a and a second electrode 106b) is provided so as to apply an electric field to the structure body 103b containing a liquid crystal.

The first electrode 106a and the second electrode 106b may be provided on one of the substrates as shown in FIGS. 1A, 1B, and 1D. Alternatively, the first electrode 106a and the second electrode 106b may be provided on their respective substrates as shown in FIGS. 1C and 1E.

As shown in FIGS. 1A, 1B, and 1C, the stabilization part 104 may be in contact with the structure body 103b containing a liquid crystal and be provided between the structure body 103b containing a liquid crystal and only one of the substrates. Alternatively, as shown in FIGS. 1D and 1E, stabilization parts 104 may be provided to be in contact with the structure body 103b containing a liquid crystal and be provided between the structure body 103b containing a liquid crystal and their respective substrates.

The structure of the top surface of the liquid crystal element of one embodiment of the present invention is exemplified in FIGS. 2A to 2D. The first electrode 106a and the second electrode 106b of one embodiment of the present invention are alternately disposed.

Figure 2B:
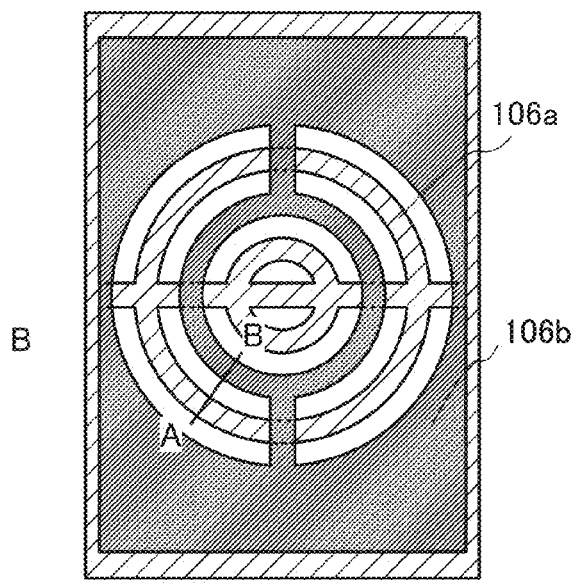
Figure 2C:
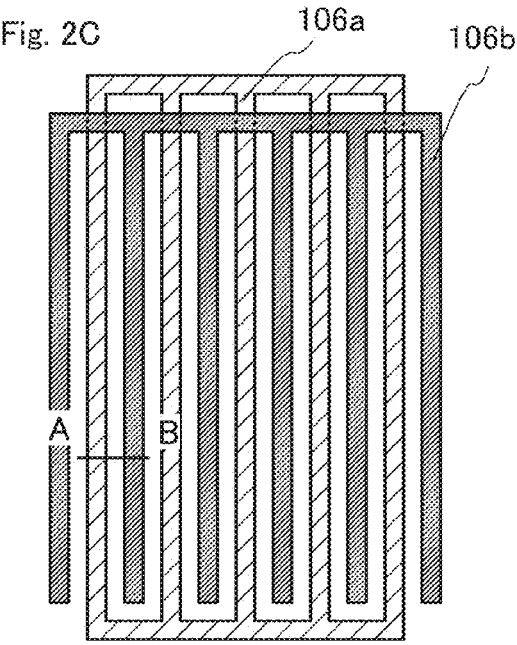
Figure 2D:
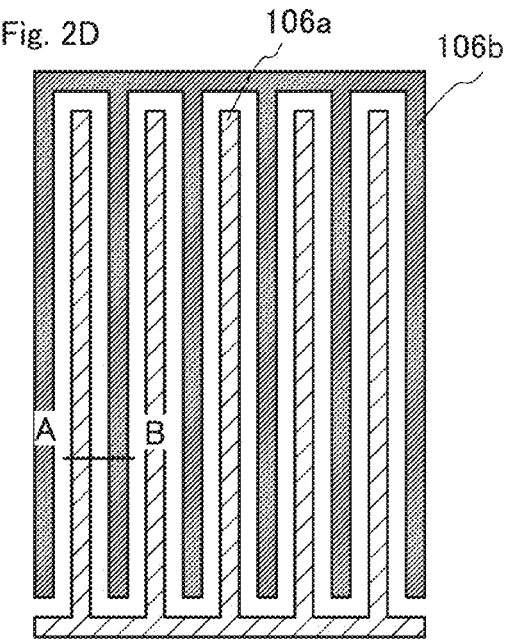

In FIG. 2A, the structure in which the first electrode 106a and the second electrode 106b have wave-like shapes is exemplified. In FIG. 2B, the structure in which the first electrode 106a and the second electrode 106b have concentric circular openings is exemplified. In FIG. 2C, the structure in which the first electrode 106a and the second electrode 106b have comb-like shapes which partly overlap with each other is exemplified. In FIG. 2D, the structure in which the first electrode 106a and the second electrode 106b have comb-like shapes which are engaged with each other is exemplified.

Note that in the case of the structure in which the first electrode 106a and the second electrode 106b are formed on the same substrate and disposed to overlap with each other (e.g., the structure shown in any of FIGS. 2A to 2C), an insulating film is provided between the first electrode 106a and the second electrode 106b.

The distance between the first electrode 106a and the second electrode 106b is determined such that the structure body 103b containing a liquid crystal, which is interposed between the first electrode 106a and the second electrode 106b, can react to a predetermined voltage applied to each of the first electrode and the second electrode. The voltage to be applied is controlled as appropriate depending on the distance.

In the liquid crystal element of one embodiment of the present invention, the pair of electrodes is provided in the manner described above. Therefore, an electric field substantially parallel to the substrate (i.e., an electric field in a horizontal direction) can be applied to liquid crystal molecules. As a result, the liquid crystal molecules can be moved in a plane substantially parallel to the substrate. Thus, when the liquid crystal molecules are controlled by an electric field in accordance with an image signal, gray scales can be expressed. Further, a wide viewing angle is achieved because the liquid crystal molecules are moved in a direction parallel to the substrate.

The liquid crystal element of one embodiment of the present invention includes the structure body 103b containing a liquid crystal which exhibits a blue phase. The structure body 103b containing a liquid crystal which exhibits a blue phase quickly responds to an electric field to operate; accordingly, the liquid crystal element of one embodiment of the present invention quickly responds to an input signal.

Structure of Stabilization Part

Figure 3A:
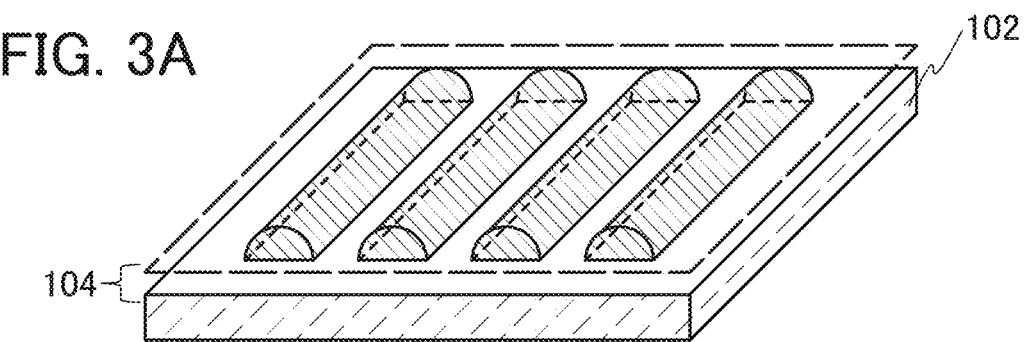
FIGS. 3A to 3C each show a structure of a stabilization part according to an embodiment.
Figure 3B:
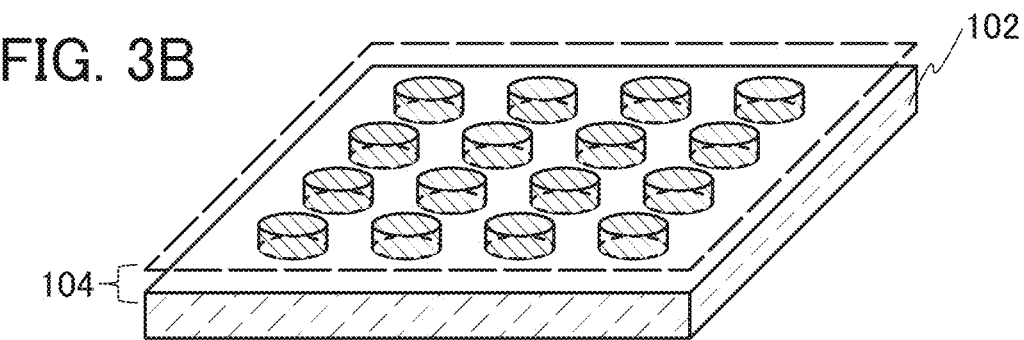
Figure 3C:
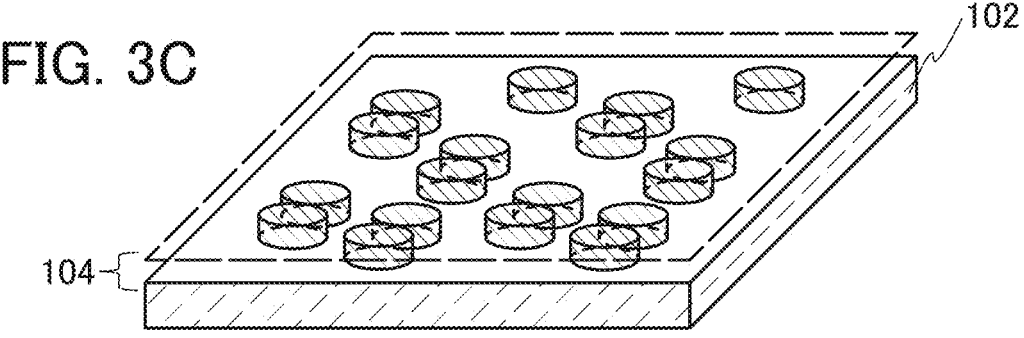

The structure of the stabilization part 104 in the liquid crystal element of one embodiment of the present invention is exemplified in FIGS. 3A to 3C. Illustrated here is an example of the structure of the stabilization part 104 in the liquid crystal element which is exemplified in FIG. 1A. Specifically, the case is described in which the stabilization part 104 is provided between the structure body 103b containing a liquid crystal and the second substrate 102 so as to be in contact with the structure body 103b containing a liquid crystal.

As a material for structure body provided in the stabilization part, an organic resin, a high molecular resin, a resist, an inorganic substance, and the like can be given as examples. An organic resin, a high molecular resin, a resist, an inorganic substance, and the like can reduce the area in the structure body containing a liquid crystal, which tends to exhibit a phase (e.g., a cholesteric phase) in which light is likely to be scattered, specifically the area of a boundary portion with different orientation states in platelet texture.

Further, the structure body provided in the stabilization part may include a blue phase. The structure body which is provided in the stabilization part and includes a blue phase can reduce the area in the structure body containing a liquid crystal, which tends to exhibit a phase (e.g., a cholesteric phase) in which light is likely to be scattered, specifically the area of a boundary portion with different orientation states in platelet texture.

Examples of the structure of the stabilization part 104 include the following: a structure including structure bodies arranged in a stripe pattern (see FIG. 3A); a structure including structure bodies arranged in a matrix (see FIG. 3B); and a structure including structure bodies arranged in an islands pattern (see FIG. 3C). With the stabilization part including the structure bodies arranged in a stripe or islands pattern, or in a matrix, a surface interaction force which is excessively applied from the substrate to the structure body containing a liquid crystal is made uniform. Further, the stabilization part can help the structure body containing a liquid crystal to form its structure in a self-organized manner and can reduce the area which tends to exhibit a phase (e.g., a cholesteric phase) in which light is likely to be scattered, specifically the area of a boundary portion with different orientation states in platelet texture.

Note that structure bodies provided in the stabilization part 104 are preferably arranged in a regular manner at intervals each of which is almost equal to the integral multiple of the distance between central axes of double twist cylinders included in a liquid crystal exhibiting a blue phase. The distance between the central axes of the double twist cylinders is almost within a range from 25 nm to 100 nm, typically within a range from 50 nm to 75 nm. The structure bodies arranged in this manner affect the orientation states of platelet texture. That is, such structure bodies have an effect of increasing the probability of a blue phase, in which a boundary portion with different orientation states in platelet texture is less included, being exhibited in the structure body 103b containing a liquid crystal.

Structure of Structure Body Containing Liquid Crystal

The structure body 103b containing a liquid crystal, which is provided in the liquid crystal element of one embodiment of the present invention, includes a liquid crystal composition and a polymer matrix. Further, the maximum thickness of the structure body 103b containing a liquid crystal is preferably greater than or equal to 1 μm and less than or equal to 20 μm.

The liquid crystal composition includes a nematic liquid crystal and a chiral material.

Examples of the nematic liquid crystal include a biphenyl-based compound, a terphenyl-based compound, a phenylcyclohexyl-based compound, a biphenylcyclohexyl-based compound, a phenylbicyclohexyl-based compound, a benzoic acid phenyl-based compound, a cyclohexyl benzoic acid phenyl-based compound, a phenyl benzoic acid phenyl-based compound, a bicyclohexyl carboxylic acid phenyl-based compound, an azomethine-based compound, an azo-based compound, an azoxy-based compound, a stilbene-based compound, a bicyclohexyl-based compound, a phenylpyrimidine-based compound, a biphenylpyrimidine-based compound, a pyrimidine-based compound, and a biphenyl ethyne-based compound.

The chiral material is used to induce twisting of the liquid crystal composition, align the liquid crystal composition in a helical structure, and make the liquid crystal composition exhibit a blue phase. For the chiral material, a compound which has an asymmetric center, high compatibility with the liquid crystal composition, and strong twisting power is used. In addition, the chiral material is an optically active substance; a higher optical purity is better and the most preferable optical purity is 99% or higher.

As the chiral material, S-811 (produced by Merck Ltd., Japan), S-1011 (produced by Merck Ltd., Japan), 1,4:3,6-dianhydro-2,5-bis[4-(n-hexyl-1-oxy)benzoic acid]sorbitol (abbreviation: ISO-(6OBA)$_2$) (produced by Midori Kagaku Co., Ltd.), or the like can be selected as appropriate.

The polymer matrix stabilizes the blue phase exhibited in the structure body 103b containing a liquid crystal. A polymerizable monomer is polymerized to form the polymer matrix.

The polymerizable monomer may be a monofunctional monomer such as acrylate or methacrylate; a polyfunctional monomer such as diacrylate, triacrylate, dimethacrylate, or trimethacrylate; or a mixture thereof. Further, the polymerizable monomer may have liquid crystallinity, non-liquid crystallinity, or both of them.

The polymerization of the polymerizable monomer may be initiated by itself. For example, a UV polymerizable monomer can be used.

Alternatively, the polymerization of the polymerizable monomer may be performed using a polymerization initiator. As the polymerization initiator, a photopolymerization initiator that initiates polymerization by light can be used, and alternatively, a thermal polymerization initiator that initiates polymerization by heat can be used. A radical polymerization initiator, a cation polymerization initiator, an anion polymerization initiator, or the like can also be used depending on the kind of the polymerizable monomer.

The polymer matrix of one embodiment of the present invention is formed in the following manner. A polymerizable monomer is polymerized after a blue phase has been exhibited in a liquid crystal composition or while a blue phase is being exhibited in an isotropic-phase liquid crystal composition. Note that a method for forming a structure body containing a liquid crystal which can be used for the liquid crystal element of one embodiment of the present invention will be described in detail in Embodiment 2 and Embodiment 3.

In the liquid crystal element of one embodiment of the present invention, the stabilization part 104 is provided in contact with the structure body 103b containing a liquid crystal so that a blue phase is exhibited, in which a boundary portion with different orientation states in platelet texture is less included. The polymer matrix is formed by polymerization of a polymerizable monomer which is performed after a blue phase, in which a boundary portion with different orientation states of platelet texture is less included, has been exhibited or while a blue phase, in which a boundary portion with different orientation states of platelet texture is less included, is being exhibited. Such a polymer matrix can stabilize a blue phase, in which a boundary portion with different orientation states of platelet texture is less included, in a wide temperature range.

Structure of Electrode

The first electrode 106a and the second electrode 106b are formed using a conductive layer.

In the case where a transmissive liquid crystal element is formed, the first electrode 106a and the second electrode 106b are preferably formed using a conductive layer that transmits visible light, so that the amount of transmitted light blocked by the electrodes can be reduced.

A conductive metal oxide can be used as a material applicable to the conductive layer that transmits visible light. Specific examples of the conductive metal oxide include indium oxide, indium oxide containing titanium, indium tin oxide (also referred to as ITO), indium tin oxide containing titanium, indium tin oxide containing silicon, indium zinc oxide, indium zinc oxide containing tungsten, zinc oxide, zinc oxide containing gallium or aluminum, and tin oxide. The conductive layer that transmits visible light may be formed using a single layer or stacked layers.

In addition, graphene may be used as a conductive material.

Structure of Substrate

In the case where a transmissive liquid crystal element is formed, the first substrate 101 and the second substrate 102 are each formed using a substrate that transmits visible light.

As the substrate that transmits visible light, for example, a single-layer structure or a stacked-layer structure of a glass substrate of barium borosilicate glass, aluminoborosilicate glass, or the like, a quartz substrate, a sapphire substrate, a ceramic substrate, a plastic substrate, or the like can be used.

Other Components

In the case where a transmissive liquid crystal element is formed, the structure body 103b containing a liquid crystal is disposed between the pair of polarizing plates. When linearly polarizing plates are used as the pair of polarizing plates, a pair of linearly polarizing plates is provided to be in a crossed Nicols state.

Further, a backlight is provided on the side of the liquid crystal element, which is opposite to the viewing side.

An optical film such as a circularly polarizing plate, a retardation plate, or an anti-reflection film can be provided as appropriate.

Modification Example 1

Reflective Liquid Crystal Element

As a modification example of this embodiment, the structure of a reflective liquid crystal element will be described.

In the case where a reflective liquid crystal element is formed, a reflection (or diffuse reflection, for example) body is disposed on the side of the structure body containing a liquid crystal, which is opposite to the viewing side. Light which enters from the viewing side and passes through the structure body containing a liquid crystal is reflected by the reflection body toward the viewing side.

An example of the structure of a reflective liquid crystal element is as follows. A structure body containing a liquid crystal is disposed between a pair of polarizing plates whose polarizing axes are oriented in one direction, and a substrate that reflects visible light is provided on the side opposite to the viewing side.

As the substrate that reflects visible light, for example, a metal substrate (specifically, a silver substrate, an aluminum substrate, a stainless steel substrate, or the like) may be formed with a single-layer structure or a stacked-layer structure, or may be stacked on a plastic substrate or the like.

Another example of the structure of a reflective liquid crystal element is as follows. A circularly polarizing plate is provided on the viewing side of the structure body containing a liquid crystal, and a first electrode or/and a second electrode each of which also serves as a reflection body is/are provided on the side of the structure body containing a liquid crystal, which is opposite to the viewing side.

The first electrode or/and the second electrode that reflect(s) visible light can be formed with a single-layer structure or a stacked-layer structure using a metal material such as molybdenum, titanium, chromium, tantalum, tungsten, neodymium, scandium, or silver; or an alloy material or conductive oxide that contains any of these metals as a main component.

Further, aluminum or copper can be used. Aluminum or copper is preferably used in combination with a refractory metal material in order to avoid problems with heat resistance and corrosion. As the refractory metal material, molybdenum, titanium, chromium, tantalum, tungsten, neodymium, scandium, or the like can be used.

Furthermore, aluminum containing nickel or aluminum containing lanthanum and nickel can be used.

In the case where a reflective liquid crystal element is formed, the first electrode or/and the second electrode on the viewing side of the structure body containing a liquid crystal is/are preferably formed using a conductive layer that transmits visible light, so that the amount of light blocked by the electrodes can be reduced An optical film (e.g., a polarizing plate, a retardation plate, or an anti-reflection film) or the like is provided as appropriate.

Modification Example 2

Semi-Transmissive Liquid Crystal Element

As a modification example of this embodiment, the structure of a semi-transmissive liquid crystal element will be described.

A semi-transmissive liquid crystal element includes two or more liquid crystal elements. A transmissive liquid crystal element is disposed on one side, and a reflective liquid crystal element is disposed on the other side.

With the transmissive liquid crystal element in the semi-transmissive liquid crystal element, light emitted from a backlight provided on the side opposite to the viewing side is transmitted to the viewing side or blocked (also referred to as a transmissive mode). Therefore, a substrate or an electrode which is disposed in a position overlapping with the backlight is formed using a substrate or an electrode that transmits visible light.

With the reflective liquid crystal element in the semi-transmissive liquid crystal element, light reflected by the reflection body provided on the side opposite to the viewing side is transmitted to the viewing side or blocked (also referred to as a reflective mode). Therefore, the substrate, or the first electrode or/and the second electrode can also serve as a reflection body.

An optical film (e.g., a polarizing plate, a retardation plate, or an anti-reflection film) or the like is provided as appropriate.

The liquid crystal element of one embodiment of the present invention which is described in this embodiment is provided with the structure body containing a liquid crystal which is in contact with the stabilization part provided on at least one of the pair of substrates and through which diffracted light of the same or substantially the same wavelength is emitted in a blue phase. With the interaction between the structure body containing a liquid crystal and the stabilization part, it is possible to reduce the area which tends to exhibit a phase (e.g., a cholesteric phase) in which light is likely to be scattered, specifically the area of a boundary portion with different orientation states in platelet texture. Further, a blue phase which is stabilized by contact with the stabilization part including a blue phase is exhibited in a wide temperature range. Thus, it is possible to provide a liquid crystal element with a high contrast ratio in a wide temperature range.

This embodiment can be combined with any of the other embodiments in this specification as appropriate.

Embodiment 2

This embodiment describes a method for manufacturing a liquid crystal element of one embodiment of the present invention. The liquid crystal element includes a structure body containing a liquid crystal which is in contact with a stabilization part provided on at least one of a pair of substrates and through which diffracted light of the same or substantially the same wavelength is emitted in a blue phase.

Specifically, the liquid crystal element includes a pair of polarizing plates, a structure body containing a liquid crystal which is disposed between the pair of polarizing plates, a pair of substrates between which the structure body containing a liquid crystal is interposed, and a pair of electrodes for applying an electric field to the structure body containing a liquid crystal. In the liquid crystal element, one of the pair of electrodes is provided on one of the pair of substrates, and the other of the pair of electrodes is provided on any of the pair of substrates. The structure body containing a liquid crystal is in contact with a stabilization part provided on at least one of the pair of substrates. Through the structure body containing a liquid crystal, diffracted light of the same or substantially the same wavelength is emitted in a blue phase. This embodiment particularly describes, with reference to FIGS. 4A to 4D, a method for manufacturing the liquid crystal element which includes the following steps: a first step of forming the stabilization part on one of the substrates; a second step of disposing a mixture including a liquid crystal composition and a polymerizable monomer between the pair of substrates to be in contact with the stabilization part provided on one of the substrates; and a third step of performing polymer stabilization treatment on the mixture exhibiting a blue phase to form the structure body containing a liquid crystal.

By the method for manufacturing the liquid crystal element of one embodiment of the present invention which is exemplified in this embodiment, it is possible to manufacture a liquid crystal display device provided with a structure body containing a liquid crystal through which diffracted light of the same or substantially the same wavelength is emitted in a blue phase. Accordingly, a method for manufacturing a liquid crystal element with a high contrast ratio in a wide temperature range can be provided.

First Step

A first step is a step of forming a stabilization part on one of the substrates.

In this embodiment, a case where a stabilization part 104 is formed on a second substrate 102 is described. Note that the stabilization part 104 exemplified in this embodiment includes island-shaped resins which are arranged at intervals of 100 nm (see FIG. 4A).

As a method for arranging the island-shaped resins at intervals of 100 nm in the stabilization part 104, nanoimprint lithography can be given. Nanoimprint lithography is a method in which minute shapes of about several nanometers are formed by transfer with the use of a mold provided with minute shapes of about several nanometers (such a mold is also referred to as a nanostamper).

For example, the following method may be used. A thermoplastic resin layer is formed on one surface of the second substrate 102. Then, the thermoplastic resin layer is pressed into a nanostamper, which is formed in advance so that the shape of the stabilization part 104 can be transferred, with the thermoplastic resin layer heated to a temperature high enough to exhibit fluidity. Cooling is performed with the thermoplastic resin layer pressed in this manner. After the cooling, the nanostamper is separated; thus, the shape of the stabilization part 104 is formed. This method is also referred to as thermoplastic nanoimprint lithography.

Alternatively, the following method may be used. A photo-curable composition layer having fluidity is formed on one surface of the second substrate 102. Light irradiation is performed with the photo-curable compound layer pressed into a nanostamper. After the photo-curable composition layer is cured, the nanostamper is separated; thus, the shape of the stabilization part 104 is formed. This method is also referred to as photo nanoimprint lithography. As a photo-curable composition used for photo nanoimprint lithography, for example, a radical polymerization type composition (specifically, a composition including an acrylic monomer or a styrene monomer) is preferable.

Second Step

A second step is a step of disposing a mixture 103a including a liquid crystal composition and a polymerizable monomer between a first substrate 101 provided with a first electrode 106a and a second electrode 106b and the second substrate 102 so as to be in contact with the stabilization part 104 provided on the second substrate 102.

The first substrate 101 and the second substrate 102 are disposed to face each other. The side of the second substrate 102, on which the stabilization part 104 is provided, faces the first substrate 101 (see FIG. 4B).

The space between the first substrate 101 and the second substrate 102 is maintained by a spacer which is not shown. A sealing material which is also not shown is provided so as to enclose a space which holds the mixture 103a including a liquid crystal composition and a polymerizable monomer. The first substrate 101 and the second substrate 102 are attached to each other with the sealing material.

An injection method or a dispenser and sealing method may be used as a method for disposing the mixture 103a including a liquid crystal composition and a polymerizable monomer between the first substrate and the second substrate so as to be in contact with the stabilization part 104 provided on the second substrate 102 side.

Third Step

A third step is a step of performing polymer stabilization treatment on the mixture 103a including a liquid crystal composition and a polymerizable monomer which is held between the second substrate 102 and the first substrate 101 so as to be in contact with the stabilization part 104 provided on the second substrate 102; thus, a structure body 103b containing a liquid crystal is formed.

In this embodiment, the mixture 103a including a liquid crystal composition and a polymerizable monomer is irradiated with light (e.g., ultraviolet light) with a blue phase exhibited, so that the polymerizable monomer included in the mixture is photopolymerized. Thus, the structure body 103b containing a liquid crystal is formed (see FIG. 4C).

Light irradiation is preferably performed with the mixture 103a exhibiting a blue phase because the structure body 103b containing a liquid crystal is easily formed in accordance with a pattern of the stabilization part.

Note that the mixture 103a exemplified in this embodiment exhibits a blue phase in a temperature range from 32° C. to 38° C., for example. The mixture 103a is in contact with the stabilization part 104; therefore, a blue phase through which diffracted light of the same or substantially the same wavelength is emitted is observed at 35° C., for example.

A blue phase in which diffracted light of the same or substantially the same wavelength is emitted is observed in the structure body 103b containing a liquid crystal after the photopolymerization.

Fourth Step

A fourth step is a step of providing the pair of substrates (the first substrate 101 and the second substrate 102) between the pair of polarizing plates (a first polarizing plate 108a and a second polarizing plate 108b). Note that the structure body 103b containing a liquid crystal is formed between the first substrate 101 and the second substrate 102 in the third step.

Figure 4A:
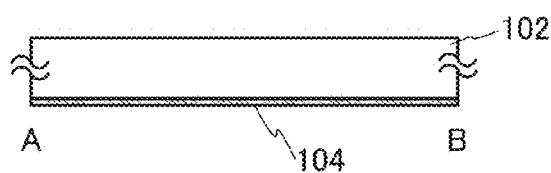
FIGS. 4A to 4D show a method for manufacturing a liquid crystal element according to an embodiment.
Figure 4B:
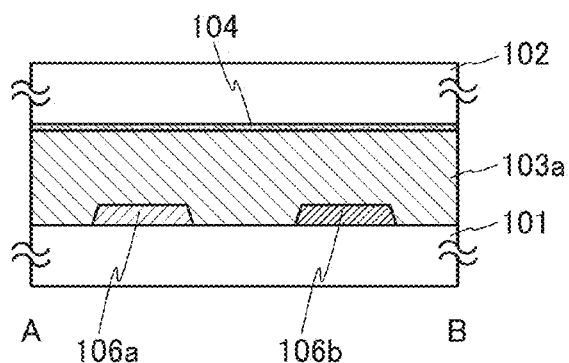
Figure 4C:
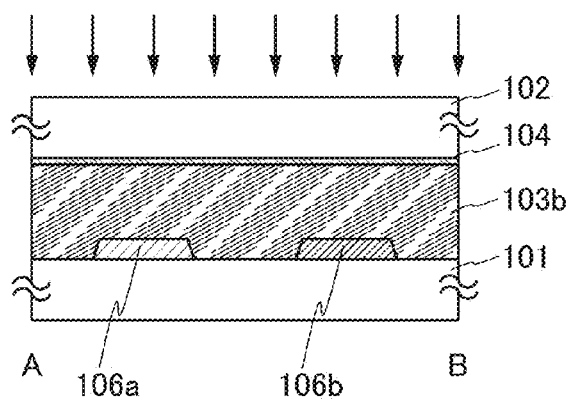
Figure 4D:
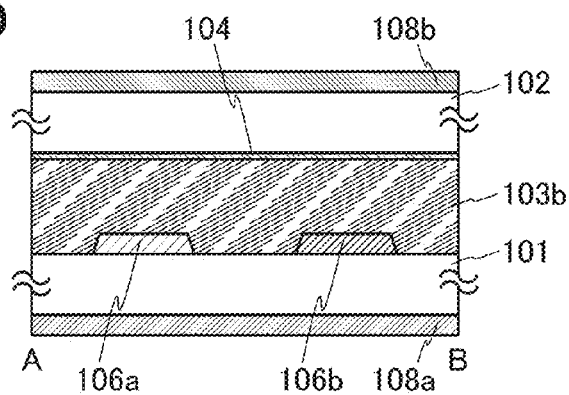

In this embodiment, the first polarizing plate 108a and the second polarizing plate 108b are attached to the first substrate 101 and the second substrate 102, respectively, with an adhesive agent so that the first polarizing plate 108a and the second polarizing plate 108b are in a crossed Nicols state (see FIG. 4D). Note that the first polarizing plate 108a and the second polarizing plate 108b are a pair of linearly polarizing plates.

By the method for manufacturing a liquid crystal element of one embodiment of the present invention which is described in this embodiment, it is possible to manufacture a liquid crystal element provided with a structure body containing a liquid crystal which is in contact with the stabilization part provided on at least one of the pair of substrates and through which diffracted light of the same or substantially the same wavelength is emitted in a blue phase. With the interaction between the structure body containing a liquid crystal and the stabilization part, it is possible to reduce the area which tends to exhibit a phase (e.g., a cholesteric phase) in which light is likely to be scattered, specifically the area of a boundary portion with different orientation states in platelet texture. Further, a blue phase which is stabilized by contact with the stabilization part including a blue phase is exhibited in a wide temperature range. Thus, it is possible to provide a liquid crystal element with a high contrast ratio in a wide temperature range.

This embodiment can be combined with any of the other embodiments in this specification as appropriate.

Embodiment 3

This embodiment describes a method for manufacturing a liquid crystal element of one embodiment of the present invention, i.e., a liquid crystal element including a structure body containing a liquid crystal which is in contact with a stabilization part provided on at least one of a pair of substrates and through which diffracted light of the same or substantially the same wavelength is emitted in a blue phase, which is different from Embodiment 2.

Embodiment 2 describes the method for manufacturing a liquid crystal element in which the stabilization part is formed over one of the substrates and the structure body containing a liquid crystal is formed with the use of the stabilization part. Embodiment 3 will describe a method for manufacturing a liquid crystal element in which a stabilization part is formed from a mixture including a liquid crystal composition and a polymerizable monomer onto a substrate and a structure body is formed with the use of the stabilization part.

Embodiment 3 specifically describes a method for manufacturing a liquid crystal element including a pair of polarizing plates, a structure body containing a liquid crystal which is disposed between the pair of polarizing plates, a pair of substrates between which the structure body containing a liquid crystal is interposed, and a pair of electrodes for applying an electric field to the structure body containing a liquid crystal. In the liquid crystal element, one of the pair of electrodes is provided on one of the pair of substrates, and the other of the pair of electrodes is provided on any of the pair of substrates. The structure body containing a liquid crystal is in contact with a stabilization part provided on at least one of the pair of substrates. Through the structure body containing a liquid crystal, diffracted light of the same or substantially the same wavelength is emitted in a blue phase. The method particularly describes, with reference to FIGS. 5A to 5D, the method for manufacturing the liquid crystal element which includes a first step of disposing a mixture including a liquid crystal composition and a polymerizable monomer between the pair of substrates, and a second step of performing polymer stabilization treatment on the mixture exhibiting an isotropic phase to form the stabilization part on at least one of the substrates and the structure body containing a liquid crystal.

By the method for manufacturing the liquid crystal element of one embodiment of the present invention which is exemplified in this embodiment, it is possible to manufacture a liquid crystal display device provided with a structure body containing a liquid crystal through which diffracted light of the same or substantially the same wavelength is emitted in a blue phase. Accordingly, a method for manufacturing a liquid crystal element with a high contrast ratio in a wide temperature range can be provided.

First Step

A first step is a step of disposing a mixture including a liquid crystal composition and a polymerization monomer between a first substrate 101 provided with a first electrode 106a and a second electrode 106b and a second substrate 102.

Figure 5A:
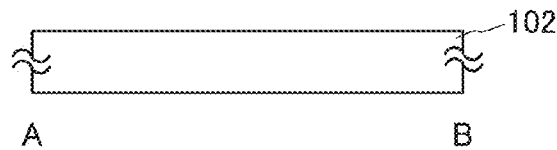
FIGS. 5A to 5D show a method for manufacturing a liquid crystal element according to an embodiment.

In the method for manufacturing a liquid crystal element of one embodiment of the present invention which is exemplified in this embodiment, the second substrate 102 which is not provided with a stabilization part is used (see FIG. 5A).

Figure 5B:
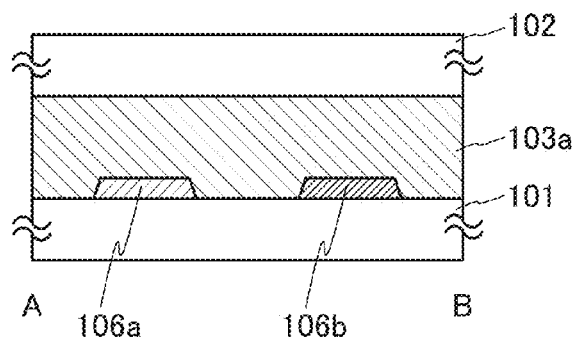
Figure 5C:
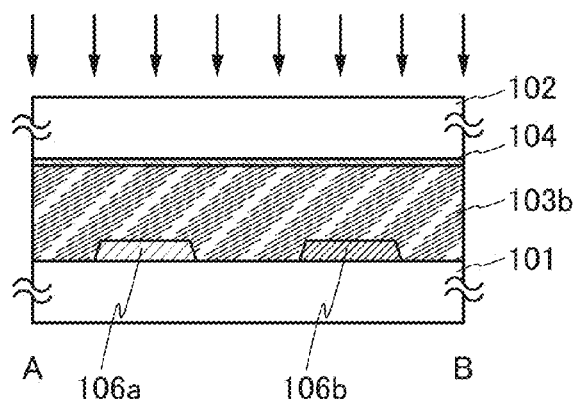

Next, the first substrate 101 and the second substrate 102 are disposed to face each other (see FIG. 5B).

The space between the first substrate 101 and the second substrate 102 is maintained by a spacer which is not shown. A sealing material which is also not shown is provided so as to enclose a space which holds a mixture 103a including a liquid crystal composition and a polymerizable monomer. The first substrate 101 and the second substrate 102 are attached to each other with the sealing material.

An injection method or a dispenser and sealing method may be used as a method for disposing the mixture 103a including a liquid crystal composition and a polymerizable monomer between the second substrate 102 and the first substrate 101.

Here, a preferable composition of the mixture including a liquid crystal composition and a polymerizable monomer is described. The mixture includes at least a liquid crystal composition and a polymerizable monomer. The liquid crystal composition includes at least a chiral material in addition to a liquid crystal.

An example of a mixture which is applicable to a liquid crystal element of one embodiment of the present invention exhibits a blue phase I. The blue phase I is a phase which is exhibited at the lowest temperature of at least three types of blue phases (blue phase I, blue phase II, and blue phase III).

In general, a mixture which is not subjected to stabilization treatment such as polymer stabilization exhibits a blue phase in a temperature range approximately from 1° C. to 5° C., for example. The temperature range is relatively narrow; therefore, even when the mixture which is not subjected to stabilization treatment such as polymer stabilization is applied to a liquid crystal element, the liquid crystal element can be used only in a narrow temperature range and thus is not sufficient for practical use. For that reason, stabilization treatment such as polymer stabilization is necessary for realizing a liquid crystal element, which can be used in a wide temperature range, with the use of a blue phase.

It is preferable that the mixture which is not subjected to stabilization treatment such as polymer stabilization exhibit a blue phase in a temperature range of higher than or equal to 5° C., preferably higher than or equal to 10° C. With the use of such a mixture, a light-emitting element of one embodiment of the present invention is easily manufactured; specifically, temperature control in the third step is facilitated.

A mixture which is not subjected to stabilization treatment such as polymer stabilization and exhibits a blue phase I in a temperature range of higher than or equal to 5° C., preferably higher than or equal to 10° C., may be formed using the following materials in combination, for example.

As a liquid crystal, a single material or a mixture material which includes at least one molecule containing a biphenyl group as its main skeleton may be used.

As a specific example of a liquid crystal material, a biphenyl-based nematic liquid crystal or the like can be given.

As specific examples of the chiral material, S-811 (produced by Merck Ltd., Japan), S-1011 (produced by Merck Ltd., Japan), 1,4:3,6-dianhydro-2,5-bis[4-(n-hexyl-1-oxy)benzoic acid]sorbitol (abbreviation: ISO-(6OBA)$_2$) (produced by Midori Kagaku Co., Ltd.), or the like can be given.

As a specific example of a liquid crystalline monomer, RM257 (produced by SYNTHON Chemicals GmbH & Co. KG) that is a UV curable liquid crystalline monomer can be given.

As a non-liquid-crystalline monomer, acrylate or the like can be used.

As a specific example of a non-liquid-crystalline monomer, lauryl acid acrylate can be given. As a specific example of a UV curable non-liquid-crystalline monomer, dodecyl methacrylate (abbreviated as DMeAc and produced by Tokyo Chemical Industry Co., Ltd.) can be given.

As a reaction initiator, a radical polymerization initiator or the like can be used.

As a specific example of the reaction initiator, DMPAP (produced by Tokyo Chemical Industry Co., Ltd.) can be given.

A specific example of mixture ratio (weight ratio) of the above-described materials is such that a biphenyl-based liquid crystal:a chiral material:a non-liquid-crystalline monomer:a liquid crystalline monomer:a polymerization initiator=84.9:6.9:4:4:0.2.

Second Step

A method for forming a structure body containing a liquid crystal, which is described in this embodiment, is different from the method described in the third step of Embodiment 2. In the third step of Embodiment 2, the mixture exhibiting a blue phase is subjected to polymer stabilization treatment so that the structure body containing a liquid crystal is formed. However, in a second step of this embodiment, a mixture exhibiting an isotropic phase is subjected to polymer stabilization treatment so that a structure body containing a liquid crystal is formed.

Further, polymer stabilization treatment is generally performed after a temperature is lowered so that a mixture including a liquid crystal composition and a polymerized monomer is changed from an isotropic phase to a blue phase. However, in the method for manufacturing a liquid crystal element of one embodiment of the present invention, polymer stabilization treatment is performed with a temperature, at which a mixture including a liquid crystal composition and a polymerized monomer before the polymer stabilization treatment exhibits an isotropic phase, maintained.

Polymer stabilization treatment is preferably performed at a temperature at which the mixture 103a including a liquid crystal composition and a polymerizable monomer exhibits an isotropic phase. When the polymer stabilization treatment is performed in this manner, the lattice structure arrangement of a blue phase which is formed from the structure body 103b containing a liquid crystal is less controlled by a surface interaction force from the substrate (see FIG. 5C).

Further, a stabilization part 104 is formed from the mixture 103a including a liquid crystal composition and a polymerizable monomer onto at least one of the substrates with an isotropic phase exhibited. The stabilization part 104 is preferably formed from the mixture 103a including a liquid crystal composition and a polymerizable monomer with an isotropic phase exhibited because a blue-phase liquid crystal has an ability to form a lattice structure in a self-organized manner and thus the stabilization part 104 is formed in accordance with a lattice structure.

Note that with the stabilization part 104, a surface interaction force which is excessively applied from the substrate to the structure body containing a liquid crystal can be made uniform. In addition, the stabilization part 104 can help the structure body containing a liquid crystal to form its structure in a self-organized manner and can reduce the area which tends to exhibit a phase (e.g., a cholesteric phase) in which light is likely to be scattered, specifically the area of a boundary portion with different orientation states in platelet texture.

Further, photopolymerization of the mixture 103a which is exemplified in this embodiment may be performed with the use of a mercury lamp which emits ultraviolet light with an intensity of 8 mW/cm² for six minutes, for example. Although the mixture may be irradiated with all the light emitted from the mercury lamp, the mixture may be irradiated with light of a specific spectrum which is selected with the use of a filter.

In the structure body 103b containing a liquid crystal after the photopolymerization, a blue phase through which diffracted light of the same or substantially the same wavelength is emitted is observed.

Third Step

A third step is a step of providing the pair of substrates (the first substrate 101 and the second substrate 102) between the pair of polarizing plates (a first polarizing plate 108a and a second polarizing plate 108b). Note that the structure body 103b containing a liquid crystal is formed between the first substrate 101 and the second substrate 102 in the second step.

Figure 5D:
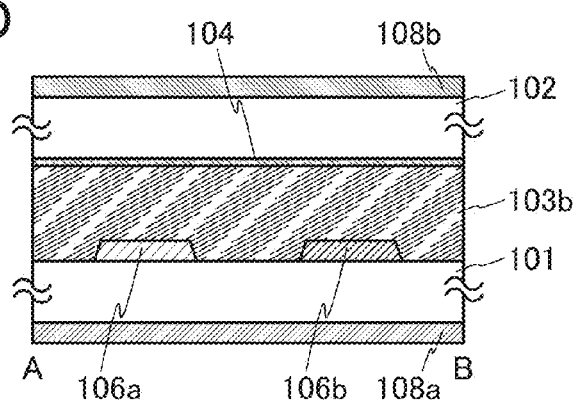

In this embodiment, the first polarizing plate 108a and the second polarizing plate 108b are attached to the first substrate 101 and the second substrate 102, respectively, with an adhesive agent so that the first polarizing plate 108a and the second polarizing plate 108b are in a crossed Nicols state (see FIG. 5D). Note that the first polarizing plate 108a and the second polarizing plate 108b are a pair of linearly polarizing plates.

By the method for manufacturing a liquid crystal element of one embodiment of the present invention which is described in this embodiment, it is possible to manufacture a liquid crystal element provided with a structure body containing a liquid crystal which is in contact with the stabilization part provided on at least one of the pair of substrates and through which diffracted light of the same or substantially the same wavelength is emitted in a blue phase. With the interaction between the structure body containing a liquid crystal and the stabilization part, it is possible to reduce the area which tends to exhibit a phase (e.g., a cholesteric phase) in which light is likely to be scattered, specifically the area of a boundary portion with different orientation states in platelet texture. Further, a blue phase which is stabilized by contact with the stabilization part including a blue phase is exhibited in a wide temperature range. Thus, it is possible to provide a liquid crystal element with a high contrast ratio in a wide temperature range.

This embodiment can be combined with any of the other embodiments in this specification as appropriate.

Embodiment 4

This embodiment describes the structure of a liquid crystal display panel including a liquid crystal element of one embodiment of the present invention, with reference to FIGS. 6A and 6B and FIGS. 7A1, 7A2, and 7B. This embodiment specifically describes the structure of a liquid crystal display panel including a liquid crystal element provided with a structure body containing a liquid crystal through which diffracted light of the same or substantially the same wavelength is emitted in a blue phase, i.e., a structure body containing a liquid crystal which shows platelet texture which is not varied. In this embodiment, description is made on the structure of a transmissive liquid crystal display panel which can be driven by an in-plane switching (IPS) mode; however, the liquid crystal display panel of one embodiment of the present invention is not limited to this structure.

The liquid crystal display panel including a liquid crystal element of one embodiment of the present invention which is exemplified in this embodiment is provided with a structure body containing a liquid crystal which is in contact with a stabilization part provided on at least one of a pair of substrates and through which diffracted light of the same or substantially the same wavelength is emitted in a blue phase. With the interaction between the structure body containing a liquid crystal and the stabilization part, it is possible to reduce the area which tends to exhibit a phase (e.g., a cholesteric phase) in which light is likely to be scattered, specifically the area of a boundary portion with different orientation states in platelet texture. Further, a blue phase which is stabilized by contact with the stabilization part including a blue phase is exhibited in a wide temperature range. Thus, it is possible to provide a liquid crystal element with a high contrast ratio in a wide temperature range.

Structure of Pixel

Figure 6A:
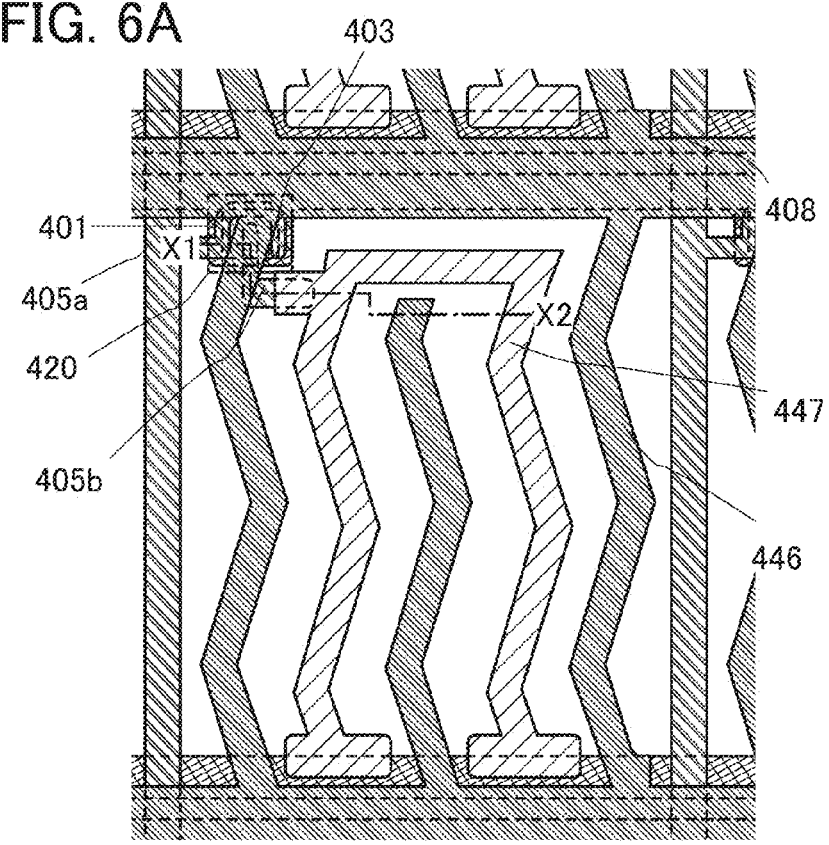
FIGS. 6A and 6B show a structure of a pixel of a liquid crystal display panel according to an embodiment.
Figure 6B:
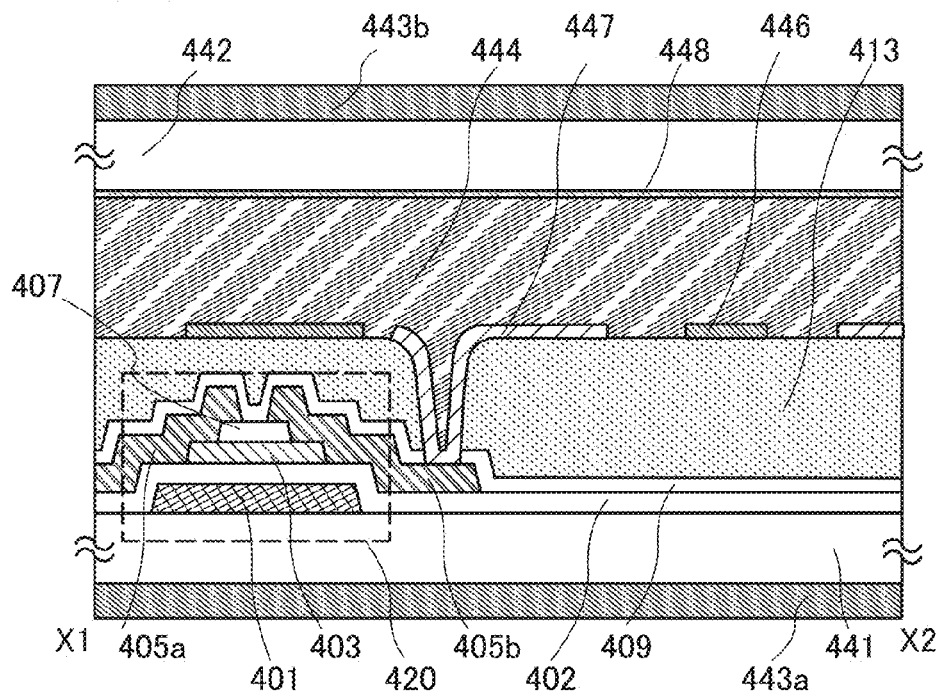

The liquid crystal display panel of one embodiment of the present invention is provided with a pixel portion including a plurality of pixels, each of which has a liquid crystal element of one embodiment of the present invention and a transistor. The structure of a pixel which is exemplified in this embodiment is described with reference to FIGS. 6A and 6B. FIG. 6A is a top view of one pixel, and FIG. 6B is a cross-sectional view taken along section line X1-X2 in FIG. 6A.

In the pixel portion of the liquid crystal display panel of one embodiment of the present invention, a plurality of source wiring layers are disposed to be in parallel with each other and be apart from each other. In FIG. 6A, a wiring layer 405a extending in a longitudinal direction is one of the source wiring layers.

In the pixel portion of the liquid crystal display panel of one embodiment of the present invention, a plurality of gate wiring layers are disposed to extend in a direction substantially orthogonal to the source wiring layers and be apart from each other. In FIG. 6A, a gate electrode layer 401 and a common wiring layer 408 which extend in a lateral direction are included in the gate wiring layers.

A region divided by the source wiring layers and the gate wiring layers corresponds to one pixel. In the pixel portion of the liquid crystal display panel of one embodiment of the present invention, pixels are arranged in matrix.

In the pixel, a comb-shaped first electrode 447 is disposed, and a second electrode 446 is disposed to be engaged with the first electrode 447. The first electrode 447 is electrically connected to a transistor 420 and serves as a pixel electrode layer. The second electrode 446 is electrically connected to the common wiring layer 408 and serves as a common electrode layer. Although the common electrode layer can operate in a floating state (an electrically isolated state), the potential of the common electrode layer may be set to a fixed potential, preferably to a potential around a common potential (an intermediate potential of an image signal which is transmitted as data) in such a level as not to generate flickers.

Further, a capacitor is formed in a portion where the first electrode 447 and the common wiring layer 408 overlap with each other.

The liquid crystal element exemplified in this embodiment can be driven by an IPS method. An IPS method is a method in which grayscale is controlled by generating an electric field which is substantially parallel to a substrate (i.e., in a horizontal direction) to move liquid crystal molecules in a plane parallel to the substrate. It is needless to say that the liquid crystal element of one embodiment of the present invention is not limited to the one driven by an IPS method. For example, the liquid crystal element exemplified in this embodiment can be driven by an FFS method when the shape of the first electrode 447 and the shape of the second electrode 446 of the liquid crystal element are changed.

Next, the structure of the cross section of the pixel is described with reference to FIG. 6B.

A structure body 444 containing a liquid crystal is disposed between a first polarizing plate 443a and a second polarizing plate 443b. The first polarizing plate 443a and the second polarizing plate 443b are linearly polarizing plates and provided to be in a crossed Nicols state.

One surface of the structure body 444 containing a liquid crystal is in contact with a stabilization part 448 provided on one surface of a second substrate 442. The other surface of the structure body 444 containing a liquid crystal is in contact with an interlayer film 413 on one surface side of a first substrate 441, and the first electrode 447 and the second electrode 446 which are provided over the interlayer film 413. Note that the first electrode 447 and the second electrode 446 are each divided and shown as a plurality of electrode layers.

The first electrode 447 is electrically connected to the transistor 420 through an opening provided in the interlayer film 413.

The transistor 420 is provided between the first substrate 441 and the interlayer film 413.

This embodiment describes a structure in which an inverted-staggered transistor including a channel protection layer is used as the transistor 420.

The transistor 420 includes the gate electrode layer 401, a gate insulating layer 402, a semiconductor layer 403, the wiring layer 405a and the wiring layer 405b each of which serves as a source electrode layer or a drain electrode layer, and a channel protection layer 407. The channel protection layer 407 is provided in a portion overlapping with a channel formed in the semiconductor layer 403. Further, an insulating film 409 is provided between the transistor 420 and the interlayer film 413 to cover the transistor 420.

As described above, the pixel exemplified in this embodiment is provided with the liquid crystal element of one embodiment of the present invention. The structure of the liquid crystal element of one embodiment of the present invention is described in Embodiment 1; therefore, a detailed description thereof is omitted here.

Further, the pixel exemplified in this embodiment includes a transistor. There is no particular limitation on the structure of the transistor applicable to the liquid crystal display panel disclosed in this specification.

For example, a staggered structure or a planar structure having a top gate structure or a bottom gate structure can be employed. The transistor may have a single-gate structure in which one channel formation region is formed, a double-gate structure in which two channel formation regions are formed, or a triple-gate structure in which three channel formation regions are formed. Alternatively, the transistor may have a dual gate structure including two gate electrode layers positioned over and below a channel region with a gate insulating layer provided therebetween.

Structure of Transistor in Pixel

The gate electrode layer 401 can be formed with a single-layer structure or a stacked-layer structure using any of metal materials such as molybdenum, titanium, chromium, tantalum, tungsten, aluminum, copper, neodymium, and scandium, and an alloy material which contains any of these materials as its main component. The gate electrode layer 401 can also be formed using a semiconductor film typified by a polycrystalline silicon film doped with an impurity element such as phosphorus, an oxide semiconductor film typified by an indium tin oxide film or a zinc oxide film, or a silicide film of nickel silicide or the like.

As a two-layer structure of the gate electrode layer 401, for example, a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, or a two-layer structure in which a titanium nitride layer and a molybdenum layer are stacked, are stacked is preferable. As a three-layer structure, a stacked-layer structure in which a tungsten layer or a tungsten nitride layer, an alloy layer of aluminum and silicon or an alloy layer of aluminum and titanium, and a titanium nitride layer or a titanium layer are stacked is preferable.

By using a light-blocking conductive film as the gate electrode layer 401, light from a backlight (light emitted through the first substrate 441) can be prevented from entering the semiconductor layer 403.

An insulating layer serving as a base film may be provided between the first substrate 441 and the gate electrode layer 401. The insulating layer serving as a base film can be formed with a single-layer structure or a stacked-layer structure using silicon nitride, silicon oxide, silicon nitride oxide, silicon oxynitride, or the like. With the insulating layer serving as a base film, diffusion of an impurity element from the first substrate 441 can be prevented.

The gate insulating layer 402 can be formed with a single-layer structure or a stacked-layer structure using silicon oxide, gallium oxide, aluminum oxide, silicon nitride, silicon oxynitride, aluminum oxynitride, silicon nitride oxide, or the like. Alternatively, a high-k material such as hafnium oxide, yttrium oxide, lanthanum oxide, hafnium silicate (HfSi$_x$O$_y$ (x>0, y>0)), hafnium aluminate (HfAl$_x$O$_y$ (x>0, y>0)), hafnium silicate to which nitrogen is added, or hafnium aluminate to which nitrogen is added may be used as a material for the gate insulating layer 402. The use of such a high-k material enables a reduction in gate leakage current.

A material of the semiconductor layer 403 is not limited to a particular material and may be determined in accordance with characteristics needed for the transistor 420, as appropriate.

The semiconductor layer 403 can be formed using the following material: an amorphous semiconductor; a polycrystalline semiconductor formed by crystallizing the amorphous semiconductor with the use of light energy or thermal energy; a microcrystalline semiconductor; or the like.

A typical example of an amorphous semiconductor is hydrogenated amorphous silicon, while a typical example of a crystalline semiconductor is polysilicon and the like. Examples of polysilicon (polycrystalline silicon) are high-temperature polysilicon that contains polysilicon formed at a process temperature of 800° C. or higher as its main component, low-temperature polysilicon that contains polysilicon formed at a process temperature of 600° C. or lower as its main component, and polysilicon obtained by crystallizing amorphous silicon using an element that promotes crystallization or the like. It is needless to say that as mentioned above, a microcrystalline semiconductor or a semiconductor containing a crystal phase in part of a semiconductor layer can be used.

An oxide semiconductor may also be used. The oxide semiconductor preferably contains at least indium (In) or zinc (Zn). In particular, In and Zn are preferably contained. In addition, as a stabilizer for reducing the variation in electric characteristics of a transistor using the oxide semiconductor, the oxide semiconductor preferably contains gallium (Ga) in addition to In and Zn. Tin (Sn) is preferably contained as a stabilizer. Hafnium (Hf) is preferably contained as a stabilizer. Aluminum (Al) is preferably contained as a stabilizer. Zirconium (Zr) is preferably contained as a stabilizer.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

As the oxide semiconductor, for example, indium oxide, tin oxide, zinc oxide, a two-component metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide, a three-component metal oxide such as an In—Ga—Zn-based oxide, an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide, or a four-component metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used.

Note that here, for example, an "In—Ga—Zn-based oxide" means an oxide containing In, Ga, and Zn as its main component and there is no particular limitation on the ratio of In:Ga:Zn. The In—Ga—Zn-based oxide may contain a metal element other than the In, Ga, and Zn.

Alternatively, a material represented by InMO$_3$(ZnO)$_m$ (m>0, m is not an integer) may be used as an oxide semiconductor. Note that M represents one or more metal elements selected from Ga, Fe, Mn, and Co. Alternatively, as the oxide semiconductor, a material expressed by a chemical formula, In$_2$SnO$_5$(ZnO)$_n$ (n>0, n is an integer) may be used.

For example, an In—Ga—Zn-based oxide with an atomic ratio of In:Ga:Zn=1:1:1 (=1/3:1/3:1/3), 2:2:1 (=2/5:2/5:1/5), or 3:1:2 (=1/2:1/6:1/3), or any of oxides whose composition is in the neighborhood of the above compositions can be used. Alternatively, an In—Sn—Zn-based oxide with an atomic ratio of In:Sn:Zn=1:1:1 (=1/3:1/3:1/3), 2:1:3 (=1/3:1/6:1/2), or 2:1:5 (=1/4:1/8:5/8), or any of oxides whose composition is in the neighborhood of the above compositions can be used.

However, without limitation to the materials given above, a material with an appropriate composition may be used depending on needed semiconductor characteristics (e.g., mobility, threshold voltage, and variation). In order to obtain the required semiconductor characteristics, it is preferable that the carrier concentration, the impurity concentration, the defect density, the atomic ratio between a metal element and oxygen, the interatomic distance, the density, and the like be set to appropriate values.

For example, in the case where the composition of an oxide containing In, Ga, and Zn at the atomic ratio, In:Ga:Zn=a:b:c (a+b+c=1), is in the neighborhood of the composition of an oxide containing In, Ga, and Zn at the atomic ratio, In:Ga:Zn=A:B:C (A+B+C=1), a, b, and c satisfy the following relation: $(a-A)^2+(b-B)^2+(c-C)^2 \le r^2$, and r may be 0.05, for example. The same applies to other oxides.

The wiring layer 405a and the wiring layer 405b can be formed with a single-layer structure or a stacked-layer structure using a metal material such as molybdenum, titanium, chromium, tantalum, tungsten, aluminum, copper, neodymium, or scandium or an alloy material which contains any of these materials as its main component.

The channel protection layer 407 can be formed with a single-layer structure or a stacked-layer structure using silicon nitride, silicon oxide, silicon oxynitride, aluminum oxide, tantalum oxide, gallium oxide, or the like.

The insulating film 409 and the interlayer film 413 can be formed with a single-layer structure or a stacked-layer structure using an inorganic material such as silicon nitride, silicon oxide, silicon oxynitride, aluminum oxide, or tantalum oxide, or an organic material such as polyimide, acrylic, benzocyclobutene, polyamide, or epoxy. Further, a low-dielectric constant material (low-k material), a siloxane-based resin, phosphosilicate glass (PSG), borophosphosilicate glass (BPSG), or the like can be used. Note that the siloxane-based resin corresponds to a resin including a Si—O—Si bond formed using a siloxane-based material as a starting material.

Structure of Liquid Crystal Display Panel

The structure of the liquid crystal display panel which is exemplified in this embodiment is described with reference to FIGS. 7A1, 7A2, and 7B. FIGS. 7A1 and 7A2 are each a top view of a liquid crystal display panel, and FIG. 7B is a cross-sectional view taken along section line M-N in FIG. 7A1 or FIG. 7A2. The structure of a transmissive liquid crystal display panel is described here, but one embodiment of the present invention is also applicable to a semi-transmissive liquid crystal display device or a reflective liquid crystal display device.

The liquid crystal display panel of one embodiment of the present invention which is shown in FIG. 7A1 includes a pixel portion 4002 and a scanning line driver circuit 4004 in a region enclosed by a sealing material 4005 for attaching a first substrate 4001 and a second substrate 4006. A signal line driver circuit 4003 is formed using a single crystal semiconductor film or a polycrystalline semiconductor film over a substrate separately prepared, and is mounted by a COG method in a region which is not included in the region enclosed by the sealing material 4005.

The liquid crystal display panel of one embodiment of the present invention which is shown in FIG. 7A2 is an example in which part of a signal line driver circuit is formed using a transistor provided over the first substrate 4001. The liquid crystal display panel of one embodiment of the present invention includes a pixel portion 4002, a scanning line driver circuit 4004, and a signal line driver circuit 4003b in a region enclosed by a sealing material 4005. Further, the signal line driver circuit 4003a is mounted by a TAB method.

Next, the structure of the cross section of the liquid crystal display panel is described with reference to FIG. 7B.

A structure body 4008 containing a liquid crystal is disposed between a first polarizing plate 4032a and a second polarizing plate 4032b. The first polarizing plate 4032a and the second polarizing plate 4032b are linearly polarizing plates and provided to be in a crossed Nicols state. This embodiment illustrates an example in which the polarizing plate is provided on an outer side (a viewing side) of the substrate. However, the polarizing plate may be provided on an inner side of the substrate. The position of the polarizing plate may be determined as appropriate depending on the material of the polarizing plate and conditions of the manufacturing process.

One surface of the structure body 4008 containing a liquid crystal is in contact with a stabilization part 4048 provided on one surface of the second substrate 4006. The other surface of the structure body 4008 containing a liquid crystal is in contact with an interlayer film 4021 provided on one surface side of the first substrate 4001, and a first electrode 4030 and a second electrode 4031 over the interlayer film 4021. Thus, a liquid crystal element 4013 is formed. Note that the first electrode 4030 and the second electrode 4031 are each divided and shown as a plurality of electrode layers.

A transistor 4010 is provided in the pixel portion 4002 and electrically connected to the first electrode 4030. A transistor 4011 is included in the scanning line driver circuit 4004. The transistor 4010 and the transistor 4011 are provided between the first substrate 4001 and the interlayer film 4021. Therefore, the transistor 4010 and the transistor 4011 can be manufactured in the same step. Although a structure in which the transistors are covered with an insulating layer 4020 is exemplified, the present invention is not limited thereto in particular.

A light-blocking layer 4034 is provided on the viewing side (the second substrate 4006 side) so as to cover the transistors 4010 and 4011. When the light-blocking layer 4034 is provided, an effect of stabilizing operation of the transistors and improving contrast of a display image is obtained.

The distance between the first substrate 4001 and the second substrate 4006 is adjusted with the use of a spacer 4035 so that a thickness of the structure body 4008 containing a liquid crystal (also referred to as cell gap) be greater than or equal to 1 µm and less than or equal to 20 µm. Note that the thickness of the structure body 4008 containing a liquid crystal refers to a maximum thickness of the structure body 4008 containing a liquid crystal. A columnar spacer formed by etching an insulating film or a spherical particle may be used for the spacer 4035.

Although not shown, a light-blocking film functioning as a black matrix may be provided.

A color filter layer or a light-blocking layer may be formed as part of the interlayer film 4021.

The liquid crystal display panel including a liquid crystal element of one embodiment of the present invention which is described in this embodiment is provided with a structure body containing a liquid crystal which is in contact with a stabilization part provided on at least one of a pair of substrates and through which diffracted light of the same or substantially the same wavelength is emitted in a blue phase. With the interaction between the structure body containing a liquid crystal and the stabilization part, it is possible to reduce the area which tends to exhibit a phase (e.g., a cholesteric phase) in which light is likely to be scattered, specifically the area of a boundary portion with different orientation states in platelet texture. Further, a blue phase which is stabilized by contact with the stabilization part including a blue phase is exhibited in a wide temperature range. Thus, it is possible to provide a liquid crystal element with a high contrast ratio in a wide temperature range.

This embodiment can be combined with any of the other embodiments in this specification as appropriate.

Embodiment 5

In this embodiment, electronic devices of one embodiment of the present invention will be described. This embodiment specifically describes, with reference to FIGS. 8A to 8E, electronic devices each mounted with a liquid crystal display panel including a liquid crystal element provided with a structure body containing a liquid crystal which exhibits diffracted light with uniform wavelength in a blue phase, i.e., a structure body containing a liquid crystal which shows platelet texture which is not varied.

Examples of the electronic devices mounted with the liquid crystal display panel of one embodiment of the present invention are television devices (also referred to as TV or television receivers), monitors for computers and the like, digital cameras, digital video cameras, digital photo frames, cellular phones (also referred to as cellular phones or portable telephone devices), portable game machines, portable information terminals, audio playback devices, large game machines such as pin-ball machines, and the like. Specific examples of these electronic devices are illustrated in FIGS. 8A to 8E.

Figure 8A:
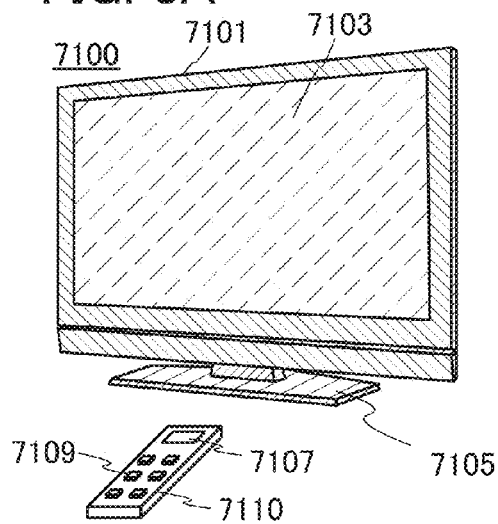
FIGS. 8A to 8E each show an electronic device according to an embodiment.

FIG. 8A illustrates an example of a television device. In a television device 7100, a display portion 7103 is incorporated in a housing 7101. Images can be displayed on the display portion 7103, and the liquid crystal display panel of one embodiment of the present invention can be used for the display portion 7103. In addition, here, the housing 7101 is supported by a stand 7105.

The television device 7100 can be operated by an operation switch of the housing 7101 or a separate remote controller 7110. With operation keys 7109 of the remote controller 7110, channels and volume can be controlled and images displayed on the display portion 7103 can be controlled.

Furthermore, the remote controller 7110 may be provided with a display portion 7107 for displaying data output from the remote controller 7110.

Note that the television device 7100 is provided with a receiver, a modem, and the like. With the use of the receiver, general television broadcasting can be received. Moreover, when the display device is connected to a communication network with or without wires via the modem, one-way (from a sender to a receiver) or two-way (between a sender and a receiver or between receivers) information communication can be performed.

Figure 8B:
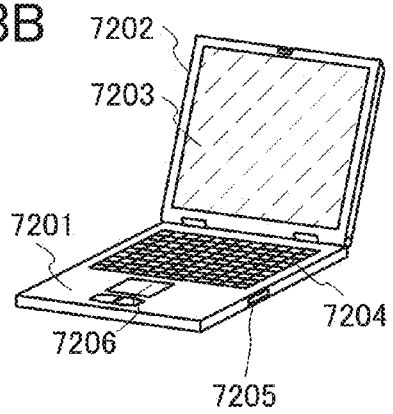

FIG. 8B illustrates a computer, which includes a main body 7201, a housing 7202, a display portion 7203, a keyboard 7204, an external connecting port 7205, a pointing device 7206, and the like. Note that the display portion 7203 of the computer includes the liquid crystal display panel of one embodiment of the present invention.

Figure 8C:
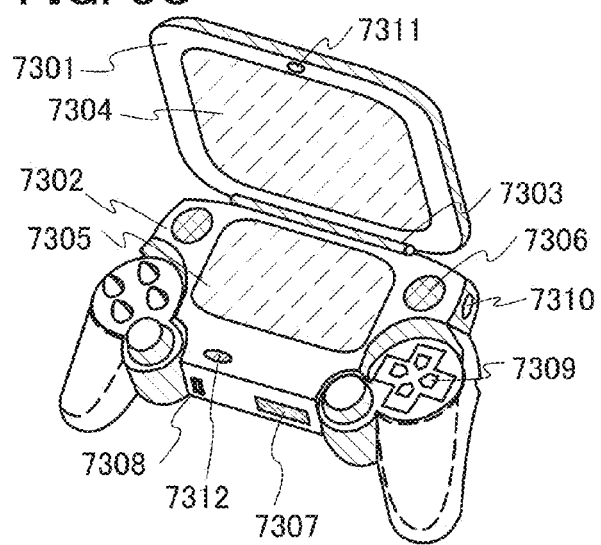

FIG. 8C illustrates a portable game machine, which includes two housings, a housing 7301 and a housing 7302, which are connected with a joint portion 7303 so that the portable game machine can be opened or folded. A display portion 7304 is incorporated in the housing 7301, and a display portion 7305 in which the liquid crystal display panel of one embodiment of the present invention is used is incorporated in the housing 7302. The portable game machine in FIG. 8C also includes a speaker portion 7306, a recording medium insertion portion 7307, an LED lamp 7308, input means (an operation key 7309, a connection terminal 7310, a sensor 7311 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, tilt angle, vibration, smell, or infrared rays), and a microphone 7312), and the like. It is needless to say that the structure of the portable game machine is not limited to the above as long as the liquid crystal display panel of one embodiment of the present invention is used for at least either the display portion 7304 or the display portion 7305, or both, and can include other accessories arbitrarily. The portable game machine illustrated in FIG. 8C has a function of reading a program or data stored in a recording medium to display it on the display portion, and a function of sharing information with another portable game machine by wireless communication. The portable game machine illustrated in FIG. 8C can have a variety of functions without limitation to the above functions.

Figure 8D:
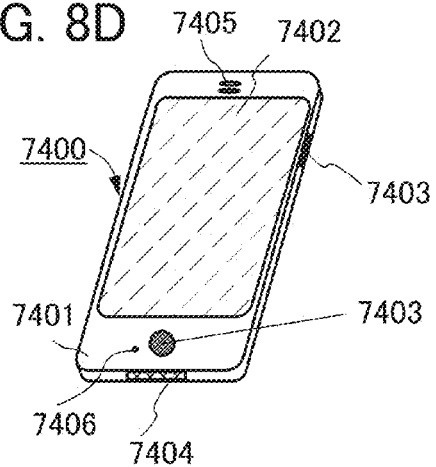

FIG. 8D illustrates an example of a cellular phone. A cellular phone 7400 is provided with a display portion 7402 incorporated in a housing 7401, an operation button 7403, an external connection port 7404, a speaker 7405, a microphone 7406, and the like. The liquid crystal display panel of one embodiment of the present invention is used for the display portion 7402 in the cellular phone 7400.

When the display portion 7402 of the cellular phone 7400 illustrated in FIG. 8D is touched with a finger or the like, data can be input into the cellular phone 7400. Further, operations such as making a call and composing e-mail can be performed by touch on the display portion 7402 with a finger or the like.

There are mainly three screen modes of the display portion 7402. The first mode is a display mode mainly for displaying images. The second mode is an input mode mainly for inputting data such as text. The third mode is a display-and-input mode in which two modes of the display mode and the input mode are combined.

For example, in the case of making a call or composing an e-mail, a text input mode mainly for inputting text is selected for the display portion 7402 so that text displayed on a screen can be inputted. In that case, it is preferable to display a keyboard or number buttons on almost all the area of the screen of the display portion 7402.

When a detection device including a sensor for detecting inclination, such as a gyroscope or an acceleration sensor, is provided inside the cellular phone 7400, display on the screen of the display portion 7402 can be automatically changed by determining the orientation of the cellular phone 7400 (whether the cellular phone is placed horizontally or vertically for a landscape mode or a portrait mode).

The screen modes are switched by touching the display portion 7402 or operating the operation button 7403 of the housing 7401. Alternatively, the screen modes can be switched depending on kinds of images displayed on the display portion 7402. For example, when a signal of an image displayed on the display portion is a signal of moving image data, the screen mode is switched to the display mode. When the signal is a signal of text data, the screen mode is switched to the input mode.

Moreover, in the input mode, when input by touching the display portion 7402 is not performed within a specified period while a signal detected by an optical sensor in the display portion 7402 is detected, the screen mode may be controlled so as to be switched from the input mode to the display mode.

The display portion 7402 may function as an image sensor. For example, an image of a palm print, a fingerprint, or the like is taken by touch on the display portion 7402 with the palm or the finger, whereby personal authentication can be performed. Further, by providing a backlight or a sensing light source which emits a near-infrared light in the display portion, an image of a finger vein, a palm vein, or the like can be taken.

Figure 8E:
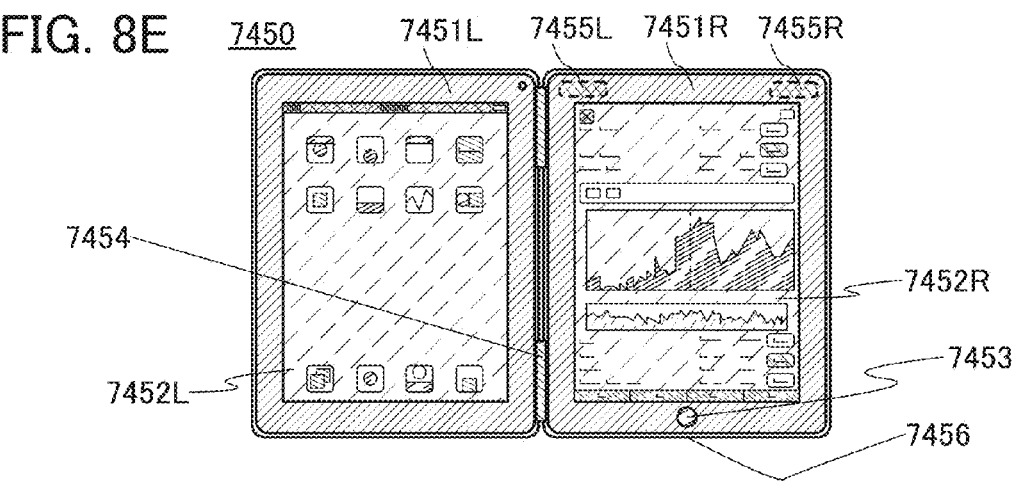

FIG. 8E illustrates an example of a folding computer. A folding computer 7450 includes a housing 7451L and a housing 7451R connected by hinges 7454. The computer 7450 further includes an operation button 7453, a left speaker 7455L, and a right speaker 7455R. In addition, a side surface of the computer 7450 is provided with an external connection port 7456, which is not illustrated. When the hinge 7454 is folded so that a display portion 7452L provided in the housing 7451L and a display portion 7452R provided in the housing 7451R face each other, the display portions can be protected by the housings.

Each of the display portions 7452L and 7452R in which the liquid crystal display panel of one embodiment of the present invention is used is a component which can display images and to which information can be input by touch with a finger or the like. For example, the icon for the installed program is selected by touch with a finger, so that the program can be started. Further, changing the distance between fingers touching two positions of the displayed image enables zooming in or out on the image. Drag of a finger touching one position of the displayed image enables drag and drop of the image. Selection of the displayed character or symbol on the displayed image of a keyboard by touch with a finger enables information input.

Further, the computer 7450 can also include a gyroscope, an acceleration sensor, a global positioning system (GPS) receiver, fingerprint sensor, or a video camera. For example, a detection device including a sensor which detects inclination, such as a gyroscope or an acceleration sensor, is provided to determine the orientation of the computer 7450 (whether the computer is placed horizontally or vertically for a landscape mode or a portrait mode) so that the orientation of the display screen can be automatically changed.

Furthermore, the computer 7450 can be connected to a network. The computer 7450 not only can display information on the Internet but also can be used as a terminal which controls another electronic device connected to the network from a distant place.

This embodiment can be combined with any of the other embodiments in this specification as appropriate.

Example 1

A liquid crystal element of one embodiment of the present invention was manufactured. Specifically, a liquid crystal element using a structure body containing a liquid crystal through which diffracted light of the same or substantially the same wavelength is emitted in a blue phase, i.e., a structure body containing a liquid crystal which shows platelet texture which is not varied, was manufactured. The detail of the liquid crystal element of this example will be described below.

Detail of Mixture Including Liquid Crystal Composition and Polymerizable Monomer Liquid Crystal 1, Liquid Crystal 2, and Liquid Crystal 3 were mixed and used as a liquid crystal material. Specifically, liquid crystal mixture E-8 (produced by LCC Corporation) was used as Liquid Crystal 1; 4-(trans-4-n-propylcyclohexyl)-3',4'-difluoro-1,1'-biphenyl (abbreviation: CPP-3FF, produced by Daily Polymer Corporation) was used as Liquid Crystal 2; and 4-n-pentylbenzoic acid 4-cyano-3-fluorophenyl ester (abbreviation: PEP-5CNF, produced by Daily Polymer Corporation) was used as Liquid Crystal 3.

As a chiral material, 1,4:3,6-dianhydro-2,5-bis[4-(n-hexyl-1-oxy)benzoic acid]sorbitol (abbreviation: ISO-(6OBA)$_2$, produced by Midori Kagaku Co., Ltd.) was used.

As a liquid-crystalline monomer, 1,4-bis[4-(6-acryloyloxy-n-hexyl-1-oxy)benzoyloxy]-2-methylbenzene (abbreviation: RM257-O6, produced by SYNTHON Chemicals GmbH & Co. KG), which was a UV curable liquid-crystalline monomer, was used.

As a non-liquid-crystalline monomer, dodecyl methacrylate (abbreviation: C12M, produced by Tokyo Chemical Industry Co., Ltd.) was used.

As a polymerization initiator, 2,2-dimethoxy-2-phenylacetophenone (abbreviation: DMPAP, produced by Tokyo Chemical Industry Co., Ltd.) was used.

Mixture ratios (weight ratios) of the above materials are shown in Table 1.

TABLE 1

| Compositions | abbreviation | Mixture ratio (weight ratio) |
| --- | --- | --- |
| Liquid Crystal 1 | E-8 | 40 |
| Liquid Crystal 2 | CPP-3FF | 30 |
| Liquid Crystal 3 | PEP-5CNF | 30 |
| Chiral material | Iso-(6OBA)$_2$ | 7.5 |
| Liquid-crystalline monomer | RM257-O6 | 4 |
| Non-liquid-crystalline monomer | C12M | 4 |
| Polymerization initiator | DMPAP | 0.2~0.3 |

The obtained mixture was disposed in a space between a pair of substrates having a transmitting property with respect to visible light, which were spaced 4 μm apart from each other.

The mixture exhibited a blue phase at a temperature of higher than or equal to 30.5° C. and lower than or equal to 36.3° C.

Detail of Photopolymerization of Mixture

The mixture including a liquid crystal composition and a polymerizable monomer was subjected to photopolymerization by being irradiated with ultraviolet light. The mixture was irradiated with ultraviolet light with an intensity of 8 mW/cm$^2$ for six minutes.

Evaluation Result

Figure 9A:
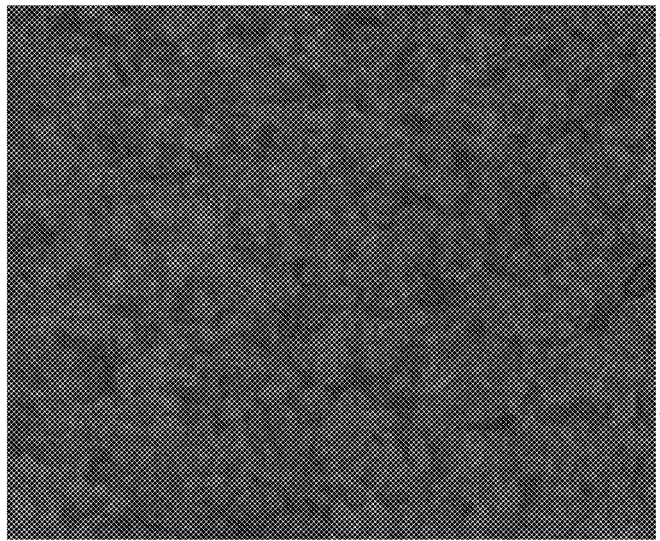
FIGS. 9A and 9B are each an image of a liquid crystal element according to an example, which is observed with a polarizing microscope.

The liquid crystal element of one embodiment of the present invention exhibited a blue phase, and diffracted light of single color (specifically, green) was observed on the entire surface. FIG. 9A is an image which is observed with a polarizing microscope. In platelet texture observed in FIG. 9A, diffracted light of green was observed, and the diffracted light had the same or substantially the same wavelength. In other words, platelet texture was not varied.

Comparison Example

A comparison example of the liquid crystal element of one embodiment of the present invention was manufactured. Specifically, a liquid crystal element including a structure body containing a liquid crystal through which diffracted light of different wavelengths is emitted in a blue phase, i.e., a structure body containing a liquid crystal which shows non-platelet texture which is not varied was manufactured. The detail of the liquid crystal element of this comparison example will be described below.

Detail of Mixture Including Liquid Crystal Composition and Polymerizable Monomer Liquid Crystal 1, Liquid Crystal 2, and Liquid Crystal 3 were mixed and used as a liquid crystal material in a manner similar to that in the above-described example.

As a chiral material, a material which was the same as that in the above-described example was used.

As a liquid-crystalline monomer, 1,4-bis[4-(3-acryloyloxy-n-propyl-1-oxy)benzoyloxy]-2-methylbenzene (abbreviation: RM257-O3, produced by SYNTHON Chemicals GmbH & Co. KG), which was a UV curable liquid-crystalline monomer, was used.

As a non-liquid-crystalline monomer, a material which was the same as that in the above-described example was used.

As a polymerization initiator, a material which was the same as that in the above-described example was used.

Mixture ratios (weight ratios) of the above materials are shown in Table 1, which were similar to those in the above-described example.

The obtained mixture of this comparison example was disposed in a space between a pair of substrates having a transmitting property with respect to visible light, which were spaced 4 μm apart from each other.

The mixture exhibited a blue phase at a temperature of higher than or equal to 30.7° C. and lower than or equal to 38.4° C.

Detail of Photopolymerization of Mixture

The mixture including a liquid crystal composition and a polymerizable monomer was subjected to photopolymerization by being irradiated with ultraviolet light. The mixture was irradiated with ultraviolet light with an intensity of 8 mW/cm$^2$ for six minutes.

Evaluation Result

Figure 9B:
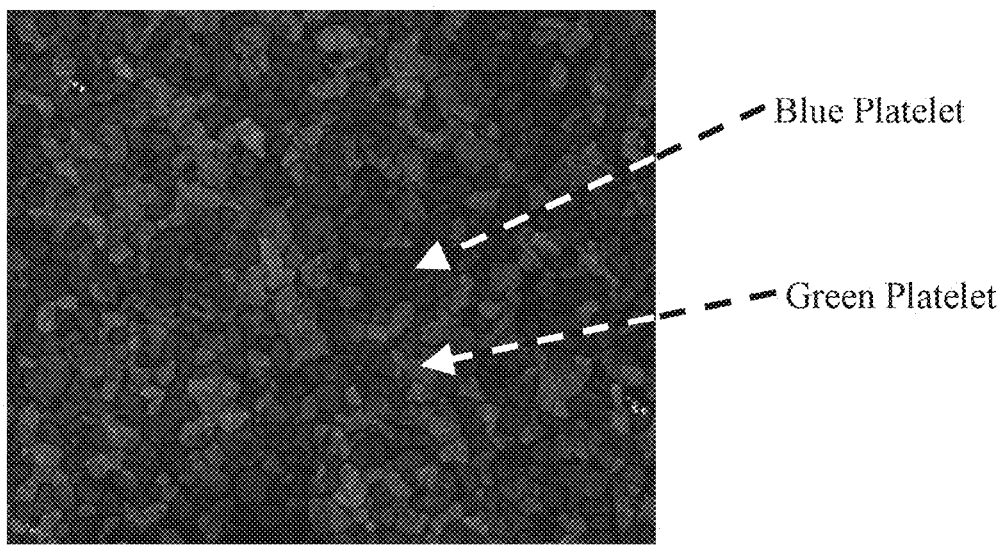

Although the liquid crystal element of this comparison example exhibited a blue phase, diffracted light of two different colors (specifically, blue and green) were observed on the entire surface. FIG. 9B is an image which is observed with a polarizing microscope. As shown in FIG. 9B, a plurality of platelets showing mosaic-like texture were observed. A platelet of a darker color, which is indicated by an arrow, exhibited blue. A platelet of a lighter color, which is indicated by another arrow, exhibited green. Platelet texture observed in this comparison example included a platelet in which diffracted light of blue was observed and a platelet in which diffracted light of green was observed. The wavelengths of the diffracted light of the platelets were neither the same nor substantially the same. In other words, platelet texture was not uniform.

This application is based on Japanese Patent Application serial no. 2011-247291 filed with Japan Patent Office on Nov. 11, 2011, the entire contents of which are hereby incorporated by reference.

What is claimed is:

1. A liquid crystal element comprising:
a pair of polarizing plates;
a structure body containing a liquid crystal and disposed between the polarizing plates, the liquid crystal being able to exhibit a blue phase;
a pair of substrates between which the structure body is interposed;
a pair of electrodes located between the substrates for applying an electric field to the structure body, and
a stabilization part between one of the substrates and the structure body,
wherein the stabilization part includes layers which are arranged at intervals each of which is an integral multiple of a distance between central axes of double twist cylinders formed by molecules of the liquid crystal exhibiting a blue phase.

2. The liquid crystal element according to claim 1, wherein the stabilization part is made from a same material as the structure body.

3. The liquid crystal element according to claim 2, wherein the distance is within 25 nm to 100 nm.

4. The liquid crystal element according to claim 1, wherein one of the electrodes is provided on one of the substrates, and
wherein the other of the electrodes is provided on the other of the substrates.

5. The liquid crystal element according to claim 1, wherein one of the electrodes is provided on one of the substrates, and
wherein the other of the electrodes is provided on the one of the substrates.

6. The liquid crystal element according to claim 1, wherein the stabilization part comprises an organic resin, a high molecular resin, a resist, or an inorganic substance.

7. The liquid crystal element according to claim 1, wherein the stabilization part includes layers arranged in a stripe or islands pattern, or in a matrix.

8. The liquid crystal element according to claim 1, wherein the distance is within 25 nm to 100 nm.

9. The liquid crystal element according to claim 1, wherein the structure body can exhibit a blue phase such that a platelet texture is not varied.

10. The liquid crystal element according to claim 1, wherein the structure body is in contact with the stabilization part.

11. A liquid crystal element comprising:
a pair of polarizing plates;
a structure body containing a liquid crystal and disposed between the polarizing plates, the liquid crystal being able to exhibit a blue phase;
a pair of substrates between which the structure body is interposed;
a pair of electrodes located between the substrates for applying an electric field to the structure body; and
a stabilization part between one of the substrates and the structure body,
wherein the stabilization part is made from a same material as the structure body.

12. The liquid crystal element according to claim 11, wherein the structure body is in contact with the stabilization part.

13. The liquid crystal element according to claim 11, wherein one of the electrodes is provided on one of the substrates, and
wherein the other of the electrodes is provided on the other of the substrates.

14. The liquid crystal element according to claim 11, wherein one of the electrodes is provided on one of the substrates, and
wherein the other of the electrodes is provided on the pair of substrates.

15. The liquid crystal element according to claim 11, wherein the stabilization part comprises an organic resin, a high molecular resin, a resist, or an inorganic substance.

16. The liquid crystal element according to claim 15, wherein the structure body can exhibit a blue phase such that a platelet texture is not varied.

17. The liquid crystal element according to claim 11, wherein the stabilization part includes layers arranged in a stripe or islands pattern, or in a matrix.

18. A liquid crystal element comprising:
a pair of polarizing plates;
a structure body containing a liquid crystal and disposed between the polarizing plates, the liquid crystal being able to exhibit a blue phase;
a pair of substrates between which the structure body is interposed;
a pair of electrodes located between the substrates for applying an electric field to the structure body; and
a stabilization part between one of the substrates and the structure body,
wherein the structure body is in contact with the stabilization part,
wherein the stabilization part can exhibit a blue phase, and
wherein the stabilization part includes layers which are arranged at intervals each of which is an integral multiple of a distance between central axes of double twist cylinders formed by molecules of the liquid crystal exhibiting a blue phase.

19. The liquid crystal element according to claim 18, wherein the stabilization part is made from a same material as the structure body.

20. The liquid crystal element according to claim 18, wherein one of the electrodes is provided on one of the substrates, and
wherein the other of the electrodes is provided on the other of the substrates.

21. The liquid crystal element according to claim 18, wherein one of the electrodes is provided on one of the substrates, and
wherein the other of the electrodes is provided on the one of the substrates.

22. The liquid crystal element according to claim 18, wherein the stabilization part comprises an organic resin, a high molecular resin, a resist, or an inorganic substance.

23. The liquid crystal element according to claim 18, wherein the stabilization part includes layers arranged in a stripe or islands pattern, or in a matrix.

24. The liquid crystal element according to claim 18, wherein the distance is within 25 nm to 100 nm.

25. The liquid crystal element according to claim 18, wherein the structure body can exhibit a blue phase such that a platelet texture is not varied.

26. A method for manufacturing a liquid crystal element comprising:
- a structure body containing a liquid crystal able to exhibit a blue phase;
- a pair of substrates between which the structure body is interposed; and
- a stabilization part between one of the substrates and the structure body,
- wherein the structure body is in contact with the stabilization part, the method for manufacturing the liquid crystal element comprising:
- a first step of forming the stabilization part on one of the substrates;
- a second step of disposing a mixture including a liquid crystal composition and a polymerizable monomer between the substrates to be in contact with the stabilization part provided on the one of the substrates; and
- a third step of performing polymer stabilization treatment on the mixture to form the structure body.

27. A method for manufacturing a liquid crystal element comprising:
- a structure body containing a liquid crystal able to exhibit a blue phase;
- a pair of substrates between which the structure body is interposed; and
- a stabilization part between one of the substrates and the structure body,
- wherein the structure body is in contact with the stabilization part,
- the method for manufacturing the liquid crystal element comprising:
- a first step of disposing a mixture including a liquid crystal composition and a polymerizable monomer between the substrates; and
- a second step of performing polymer stabilization treatment on the mixture to form the structure body,
- wherein the stabilization part is formed from the mixture on the one of the substrates.

28. The method for manufacturing a liquid crystal element of claim 27, wherein the stabilization part is made from a same material as the structure body.

* * * * *